(12) United States Patent
Wu et al.

(10) Patent No.: US 12,468,973 B2
(45) Date of Patent: Nov. 11, 2025

(54) PHYSICAL TRANSFORMATIONS FOR MULTI-DIMENSIONAL DATA QUANTUM REPRESENTATIONS

(71) Applicant: University of Florida Research Foundation, Incorporated, Gainesville, FL (US)

(72) Inventors: Dapeng Oliver Wu, Gainesville, FL (US); Chaoyue Sun, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 727 days.

(21) Appl. No.: 17/809,390

(22) Filed: Jun. 28, 2022

(65) Prior Publication Data

US 2023/0013217 A1    Jan. 19, 2023

Related U.S. Application Data

(60) Provisional application No. 63/218,065, filed on Jul. 2, 2021.

(51) Int. Cl.
*G06F 17/14* (2006.01)
*G06N 10/20* (2022.01)
(Continued)

(52) U.S. Cl.
CPC ........... *G06N 10/40* (2022.01); *G06F 17/142* (2013.01); *G06N 10/20* (2022.01); *G06N 10/60* (2022.01)

(58) Field of Classification Search
CPC ........ G06N 10/40; G06N 10/20; G06N 10/60; G06F 17/142; G06F 17/141
See application file for complete search history.

(56) References Cited

U.S. PATENT DOCUMENTS

| 7,113,967 B2 * | 9/2006 | Cleve ..................... B82Y 10/00 257/14 |
| 10,621,268 B1 * | 4/2020 | Batruni ................... G06F 17/10 |

(Continued)

FOREIGN PATENT DOCUMENTS

| EP | 1429284 A2 * | 6/2004 | ............. B82Y 10/00 |
| EP | 3570223 A1 * | 11/2019 | ............. G06F 16/22 |

*Primary Examiner* — Nghia M Doan
(74) *Attorney, Agent, or Firm* — Alston & Bird LLP

(57) ABSTRACT

Various embodiments of the present disclosure provide systems and methods for generally generating and transforming physical quantum representations of multi-dimensional tensor data objects. Specifically, various embodiments enable the rapid and efficient generation of a physical quantum representation representing the Fourier transform of a multi-dimensional tensor data object based at least in part on manipulating another physical quantum representation of the multi-dimensional tensor data object itself via quantum manipulation operations. Information may be extracted from the generated physical quantum representation to determine the Fourier transform of the multi-dimensional tensor data object. Accordingly, various embodiments may comprise quantum manipulation operations for a tensor-form quantum Fourier transform (TQFT) for a multi-dimensional tensor data object. Various embodiments for the TQFT are advantageously comprehensive, versatile, and applicable to any quantum representation form for a multi-dimensional tensor data object. The TQFT may be performed in any quantum computing system and/or simulated quantum computing system.

20 Claims, 13 Drawing Sheets

(51) Int. Cl.
*G06N 10/40* (2022.01)
*G06N 10/60* (2022.01)

(56) References Cited

U.S. PATENT DOCUMENTS

2021/0209270 A1* 7/2021 Huang .................... G06F 30/20
2021/0334313 A1* 10/2021 Huang ................ G06F 16/9024

* cited by examiner

PHYSICAL TRANSFORMATIONS FOR MULTI-DIMENSIONAL DATA QUANTUM REPRESENTATIONS

CROSS REFERENCE TO RELATED APPLICATION

This application claims the priority of U.S. Provisional Application No. 63/218,065, entitled "PHYSICAL TRANSFORMATIONS FOR MULTI-DIMENSIONAL DATA QUANTUM REPRESENTATIONS," filed on Jul. 2, 2021, the disclosure of which is hereby incorporated by reference in its entirety.

TECHNOLOGICAL FIELD

Embodiments of the present disclosure generally relate to systems and methods for physical quantum or qubit representations of data.

BACKGROUND

Quantum computing uses several quantum phenomena such as superposition and entanglement to perform computation. Because of a quantum computer's powerful computing ability, several classical tasks have been solved in quantum versions, such as searching problems and cryptography. Quantum image processing (QIP) is a recently developed field that uses quantum states to represent classical images and perform image analysis, such as geometric transformation, image filtering, and image compression.

BRIEF SUMMARY

The discrete Fourier transform has been widely used in signal processing tasks in the classical computing field. As a generalized form of Fourier transform, a multi-dimensional Fourier transform can be applied if input data is a tensor, such as a second-order tensor like an image or a third-order tensor like the point cloud. In the classical computing field, techniques such as the Fast Fourier Transform (FFT) algorithm have been optimized to efficiently determine the Fourier transform of an input tensor, or transform the input tensor into a Fourier space basis. However, due to the inherent differences between the classical computing field and the quantum computing field, such techniques for determining the Fourier transform may be extremely inefficient, slow, and/or impossible to perform using a quantum computing system.

In general, embodiments of the present disclosure provide methods, apparatus, system, computing devices, computing entities, and/or the like for controlling a quantum computing system to generate and transform physical quantum representations of multi-dimensional tensor data objects. Specifically, various embodiments enable the rapid and efficient transformation of a physical quantum representation of a multi-dimensional tensor data object to another physical quantum representation representing the Fourier transform of the multi-dimensional tensor data object. That is, various embodiments involve performing a multi-dimensional discrete Fourier transform on the physical quantum representation of a multi-dimensional tensor data object. Accordingly, various embodiments may be understood as describing a tensor-form quantum Fourier transform (TQFT) for a multi-dimensional tensor data object. In various embodiments, the TQFT for a multi-dimensional tensor data object may be performed in a simulated quantum computing system.

Various embodiments provide technical advantages, as the generation and transformation (e.g., the TQFT) of physical quantum representations for multi-dimensional tensor data objects, as described in the present disclosure, is more efficient and faster than existing methods of transforming data into the Fourier space, such as by using a classical computer. Specifically, operations for determining the Fourier transform of an input multi-dimensional tensor data object in a quantum computing system may be performed simultaneously (e.g., in parallel) for different portions of the input multi-dimensional tensor data object, thereby leading to the conservation of processing time and resources. Thus, the present disclosure includes at least certain methods of controlling a quantum computing system to advantageously transform a physical quantum representation of a multi-dimensional tensor data object to another physical quantum representation of the Fourier Transform of the multi-dimensional tensor data object and encoding frequency information of the multi-dimensional tensor data object in an efficient manner to thereby conserve time, resources, and processing power.

Methods, apparatuses, and computer program products are disclosed for controlling a quantum computing system by transforming physical quantum representations. According to some embodiments, the method comprises receiving a multi-dimensional Fourier transform operation request comprising a multi-dimensional tensor data object and an indication of a quantum representation form, generating a first physical quantum representation representing the multi-dimensional tensor data object according to the quantum representation form by manipulating a plurality of qubit atomic entities, determining one or more quantum manipulation operations to be performed on the plurality of qubit atomic entities based at least in part on the quantum representation form, generating a second physical quantum representation representing a Fourier transform of the multi-dimensional tensor data object in matrix multiplication form by manipulating the plurality of qubit atomic entities based at least in part on the one or more quantum manipulation operations, generating an output data object based at least in part on measuring each of the plurality of qubit atomic entities, and performing one or more automated actions based at least in part on the output data object.

In some embodiments, the output data object may represent the Fourier transform of the multi-dimensional tensor data object and is based at least in part on measuring each of the plurality of qubit atomic entities of the second physical quantum representation. In some embodiments, the method may further comprise receiving a second operation request indicating an operation to process one of (i) the multi-dimensional tensor data object represented by the first physical quantum representation, or (ii) the Fourier transform of the multi-dimensional tensor data object represented by the second physical quantum representation, determining one or more additional quantum manipulation operations for processing the one of (i) the multi-dimensional tensor data object represented by the first physical quantum representation, or (ii) the Fourier transform of the multi-dimensional tensor data object represented by the second physical quantum representation, and generating a third physical quantum representation by manipulating the plurality of qubit atomic entities based at least in part on the one or more additional quantum manipulation operations. In some embodiments, the output data object may be based at least in part on measuring each of the plurality of qubit atomic entities of the third physical quantum representation.

In some embodiments, the quantum representation form may be one of (i) Flexible Representation of Quantum Images (FRQI), (ii) normal arbitrary quantum superposition state (NAQSS), (iii) generalized Novel Enhanced Quantum Representation (GNEQR), (iv) Caraiman's Quantum Image Representation (CQIR), (v) quantum representation of real-valued digital signals (QRDS), and (vi) Improved FRQI (IFRQI). In some embodiments, generating a second physical quantum representation representing the Fourier transform may further comprise manipulating one or more subsets of qubit atomic entities of the plurality of qubit atomic entities at substantially the same time in parallel, a subset of qubit atomic entities encoding the multi-dimensional tensor data object in one dimension. In some embodiments, each subset of qubit atomic entities may be manipulated according to a one-dimensional quantum Fourier transform (1-D QFT). In some embodiments, the one or more automated actions may comprise generating a visualization of the output data object and providing the visualization for display. In some embodiments, the plurality of qubit atomic entities may comprise a plurality of simulated qubits within a simulated quantum system.

According to some embodiments, the apparatus comprises at least one processor and at least one memory including program code, the at least one memory and the program code configured to, with the processor, cause the apparatus to at least: receive a multi-dimensional Fourier transform operation request comprising a multi-dimensional tensor data object and an indication of a quantum representation form, generate a first physical quantum representation representing the multi-dimensional tensor data object according to the quantum representation form by manipulating a plurality of qubit atomic entities, determine one or more quantum manipulation operations to be performed on the plurality of qubit atomic entities based at least in part on the quantum representation form, generate a second physical quantum representation representing a Fourier transform of the multi-dimensional tensor data object in matrix multiplication form by manipulating the plurality of qubit atomic entities based at least in part on the one or more quantum manipulation operations, generate an output data object based at least in part on measuring each of the plurality of qubit atomic entities, and perform one or more automated actions based at least in part on the output data object.

In some embodiments, the output data object may represent the Fourier transform of the multi-dimensional tensor data object and is based at least in part on measuring each of the plurality of qubit atomic entities of the second physical quantum representation. In some embodiments, the at least one memory and the program code may be further configured to, with the processor, cause the apparatus to at least: receive a second operation request indicating an operation to process one of (i) the multi-dimensional tensor data object represented by the first physical quantum representation, or (ii) the Fourier transform of the multi-dimensional tensor data object represented by the second physical quantum representation, determine one or more additional quantum manipulation operations for processing the one of (i) the multi-dimensional tensor data object represented by the first physical quantum representation, or (ii) the Fourier transform of the multi-dimensional tensor data object represented by the second physical quantum representation, and generate a third physical quantum representation by manipulating the plurality of qubit atomic entities based at least in part on the one or more additional quantum manipulation operations. In some embodiments, the output data object may be based at least in part on measuring each of the plurality of qubit atomic entities of the third physical quantum representation. In some embodiments, the quantum representation form may be one of (i) Flexible Representation of Quantum Images (FRQI), (ii) normal arbitrary quantum superposition state (NAQSS), (iii) generalized Novel Enhanced Quantum Representation (GNEQR), (iv) Caraiman's Quantum Image Representation (CQIR), (v) quantum representation of real-valued digital signals (QRDS), and (vi) Improved FRQI (IFRQI). In some embodiments, generating a second physical quantum representation representing the Fourier transform may further comprise manipulating one or more subsets of qubit atomic entities of the plurality of qubit atomic entities at substantially the same time in parallel, a subset of qubit atomic entities encoding the multi-dimensional tensor data object in one dimension.

In some embodiments, the computer program product comprises at least one non-transitory computer-readable storage medium having computer-readable program code portions stored therein, wherein the computer-readable program code portions are configured to: receive a multi-dimensional Fourier transform operation request comprising a multi-dimensional tensor data object and an indication of a quantum representation form, generate a first physical quantum representation representing the multi-dimensional tensor data object according to the quantum representation form by manipulating a plurality of qubit atomic entities, determine one or more quantum manipulation operations to be performed on the plurality of qubit atomic entities based at least in part on the quantum representation form, generate a second physical quantum representation representing a Fourier transform of the multi-dimensional tensor data object in matrix multiplication form by manipulating the plurality of qubit atomic entities based at least in part on the one or more quantum manipulation operations, generate an output data object based at least in part on measuring each of the plurality of qubit atomic entities, and perform one or more automated actions based at least in part on the output data object.

In some embodiments, the output data object may represent the Fourier transform of the multi-dimensional tensor data object and is based at least in part on measuring each of the plurality of qubit atomic entities of the second physical quantum representation. In some embodiments, the computer-readable program code portions may be further configured to: receive a second operation request indicating an operation to process one of (i) the multi-dimensional tensor data object represented by the first physical quantum representation, or (ii) the Fourier transform of the multi-dimensional tensor data object represented by the second physical quantum representation, determine one or more additional quantum manipulation operations for processing the one of (i) the multi-dimensional tensor data object represented by the first physical quantum representation, or (ii) the Fourier transform of the multi-dimensional tensor data object represented by the second physical quantum representation, and generate a third physical quantum representation by manipulating the plurality of qubit atomic entities based at least in part on the one or more additional quantum manipulation operations. In some embodiments, the output data object may be based at least in part on measuring each of the plurality of qubit atomic entities of the third physical quantum representation. In some embodiments, the quantum representation form may be one of (i) Flexible Representation of Quantum Images (FRQI), (ii) normal arbitrary quantum superposition state (NAQSS), (iii)

generalized Novel Enhanced Quantum Representation (GNEQR), (iv) Caraiman's Quantum Image Representation (CQIR), (v) quantum representation of real-valued digital signals (QRDS), and (vi) Improved FRQI (IFRQI).

BRIEF DESCRIPTION OF THE DRAWINGS

Having thus described the present disclosure in general terms, reference will now be made to the accompanying drawings, which are not necessarily drawn to scale.

Figure 1:
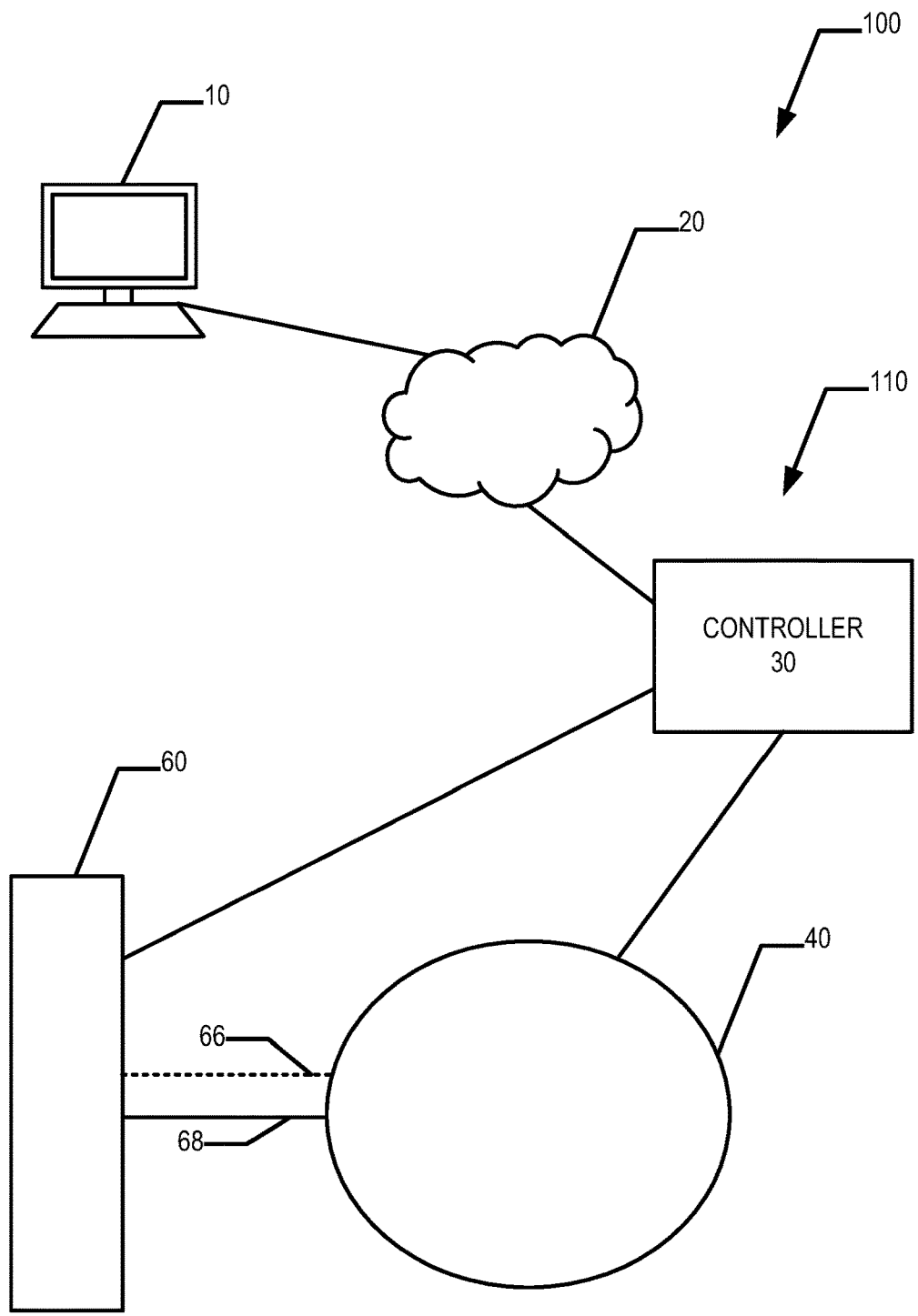

FIG. 1 provides a schematic diagram of an example quantum computing system, in accordance with various embodiments of the present disclosure.

Figure 2:
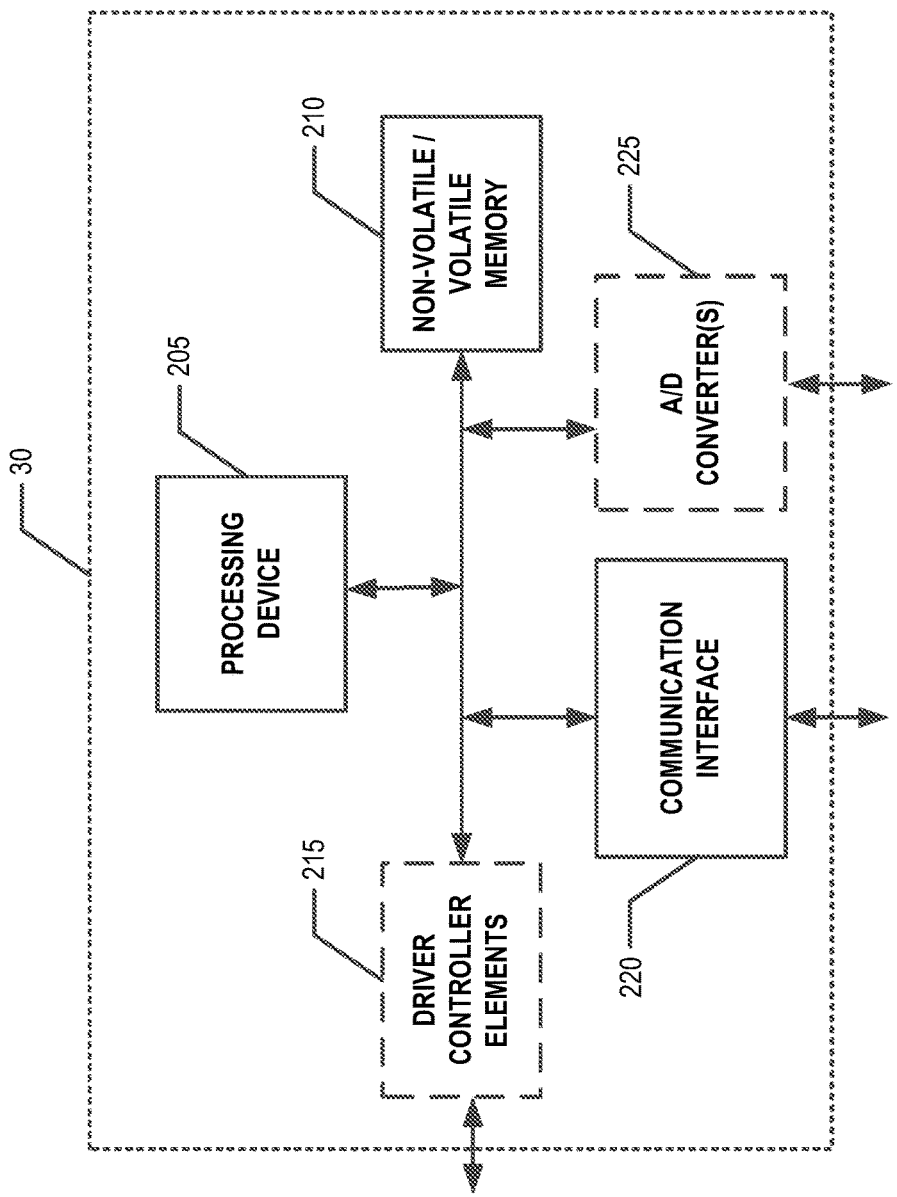

FIG. 2 provides a schematic diagram of an example controller for a quantum computing system, in accordance with various embodiments of the present disclosure.

Figure 3:
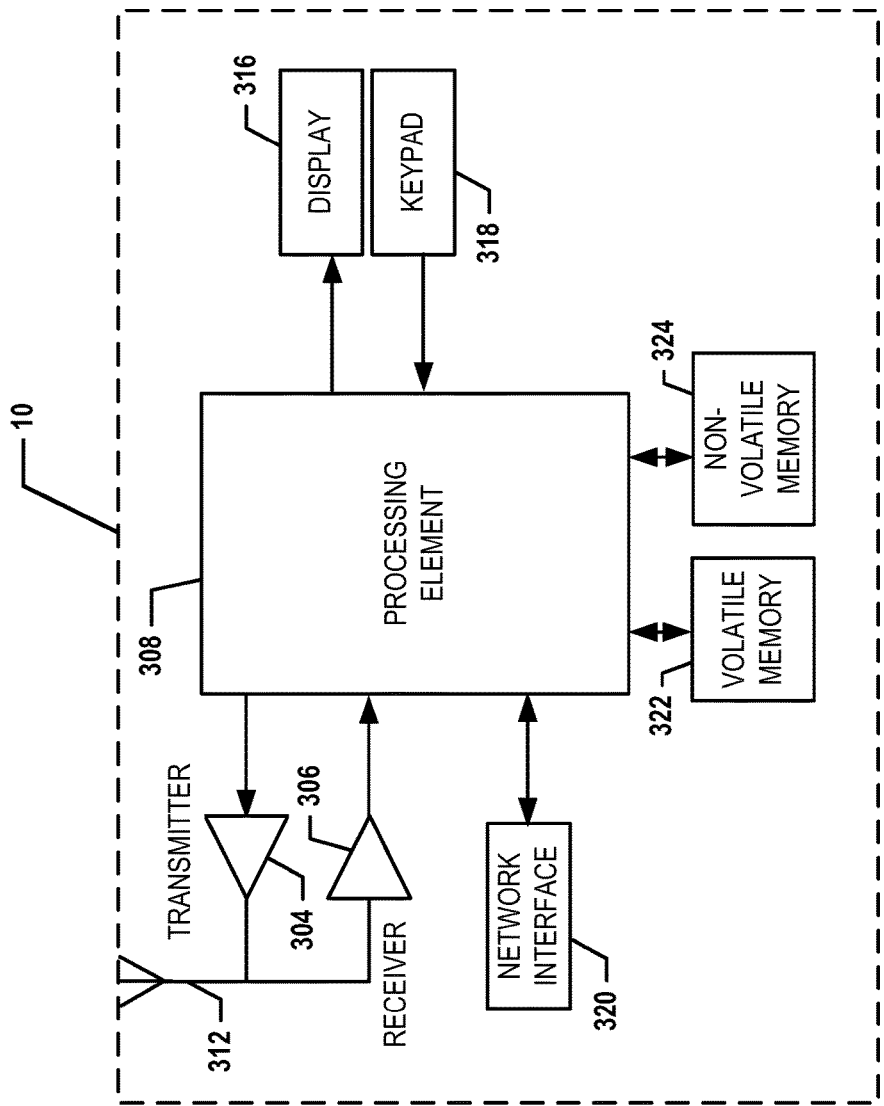

FIG. 3 provides a schematic diagram of an example system computing entity, in accordance with various embodiments of the present disclosure.

Figure 4:
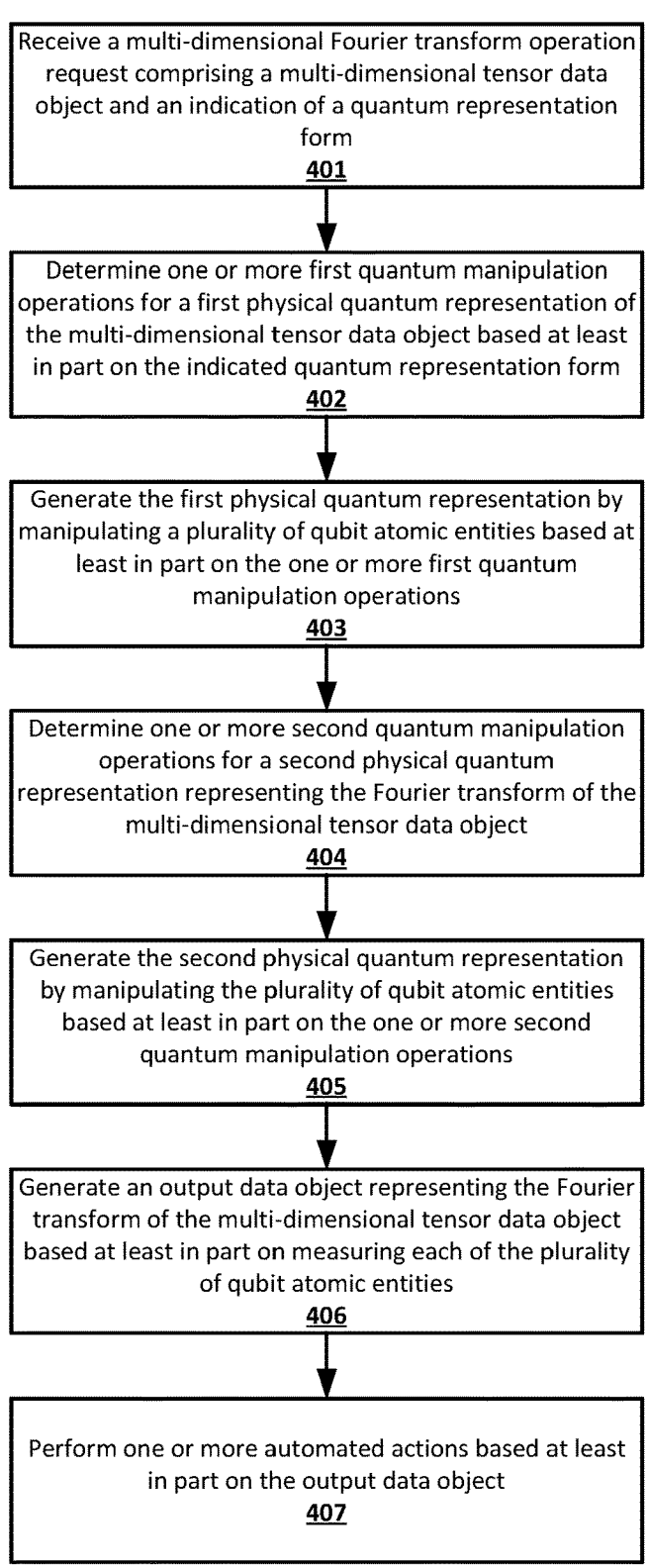

FIG. 4 illustrates an example process for controlling a quantum computing system to generate and transform physical quantum representations of multi-dimensional tensor data objects, in accordance with various example embodiments of the present disclosure.

Figure 5A:
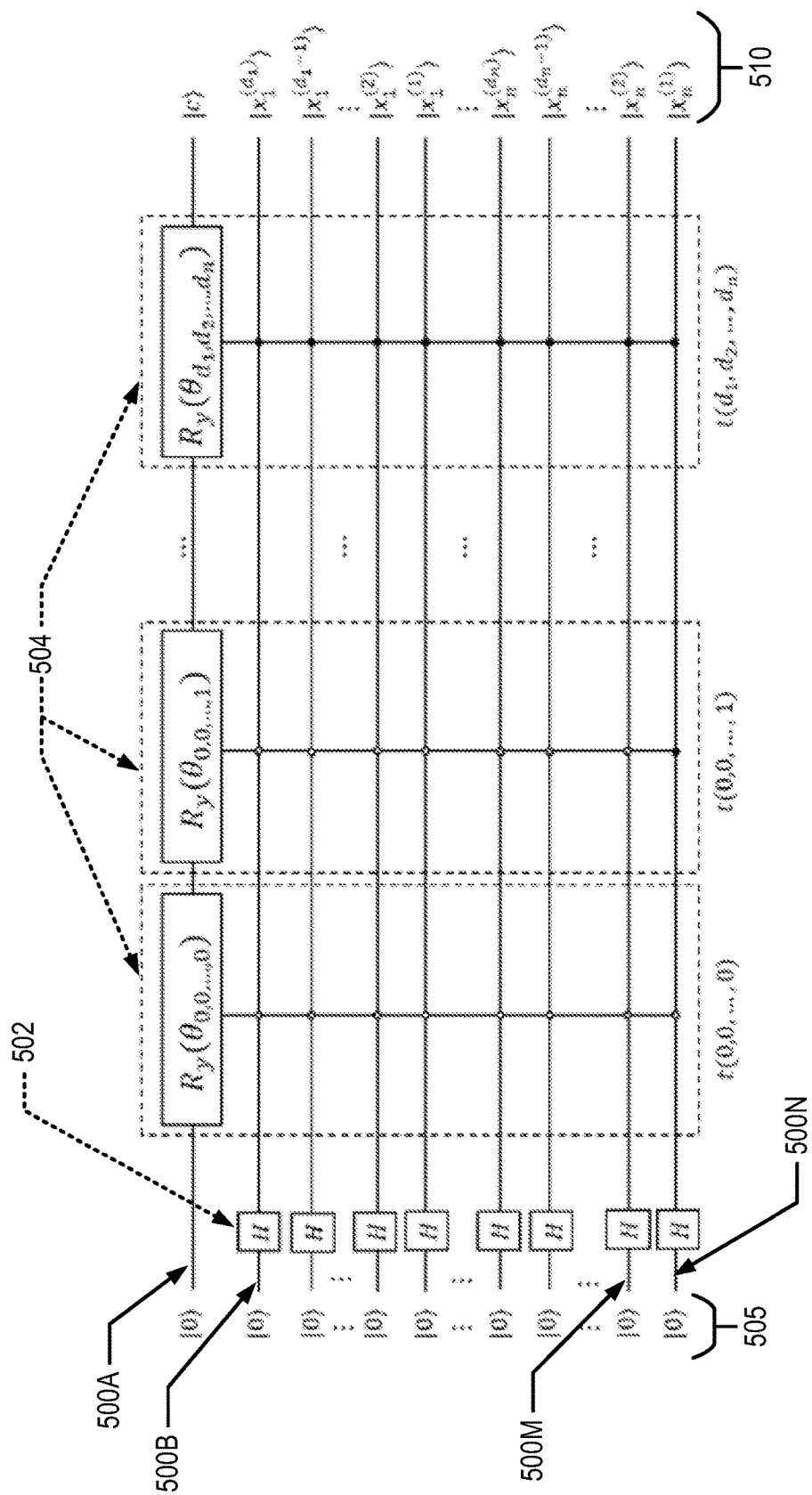
Figure 5B:
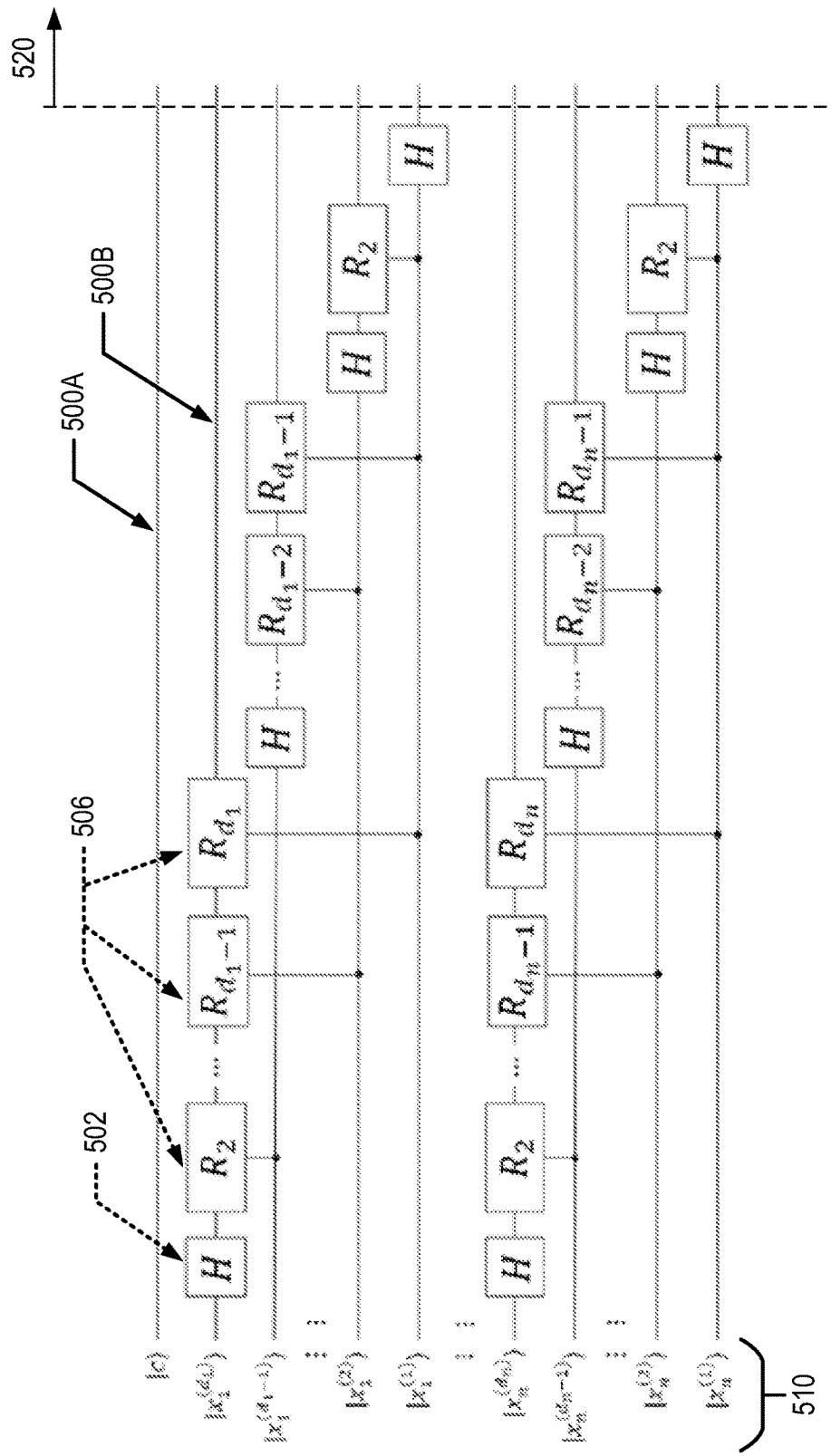

FIGS. 5A-B illustrate various schematics of quantum manipulation operations for generating and transforming physical quantum representations of multi-dimensional tensor data objects, in accordance with various example embodiments of the present disclosure.

Figure 6A:
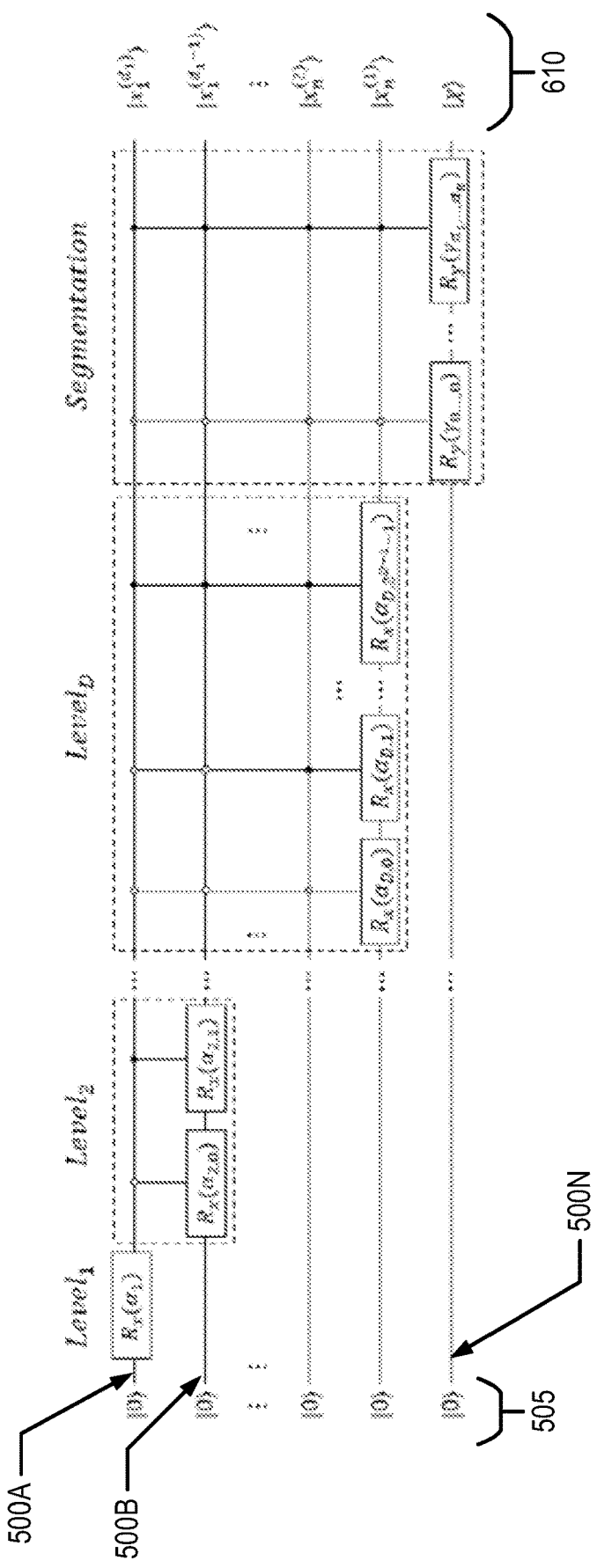
Figure 6B:
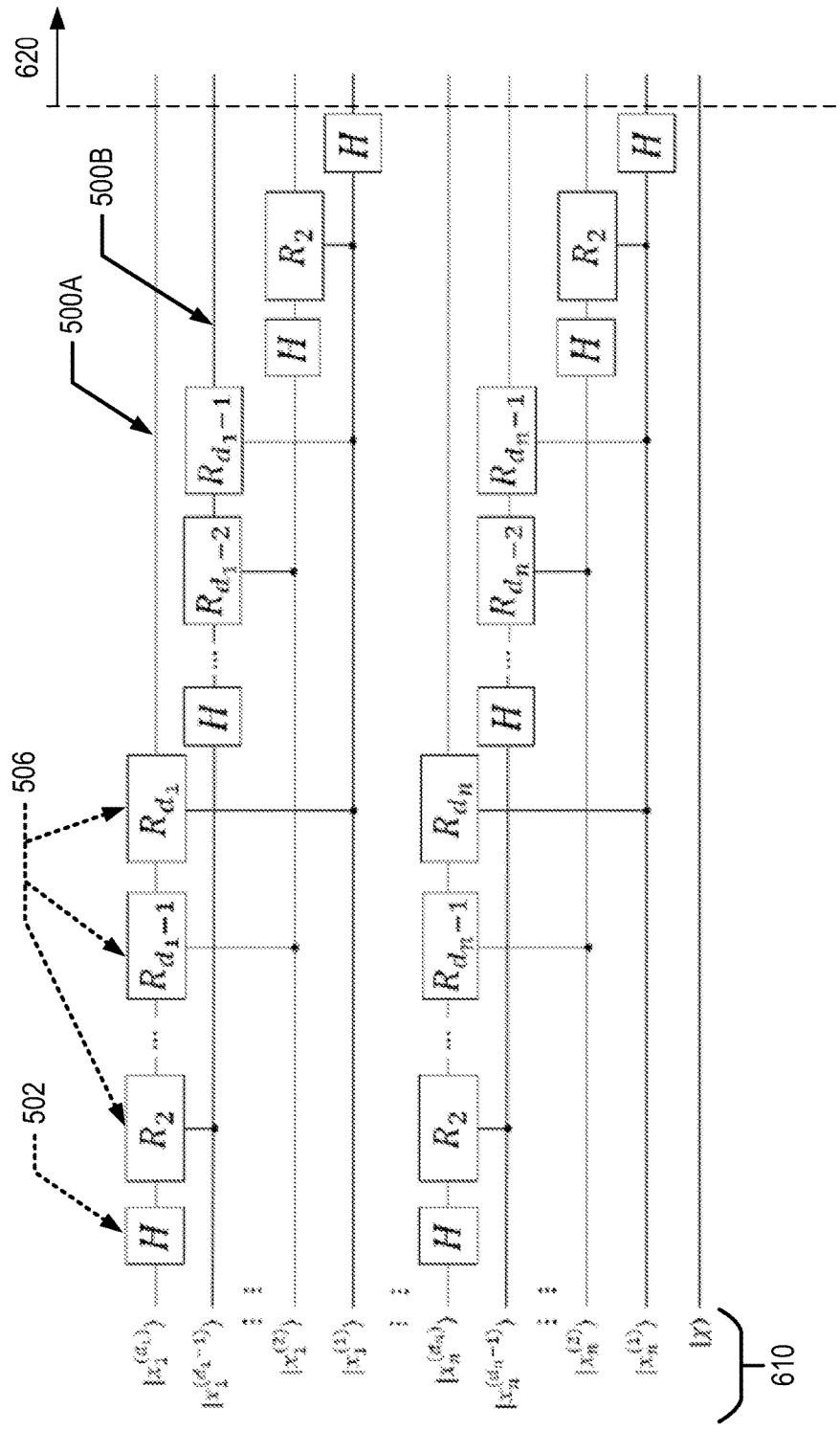

FIGS. 6A-B illustrate various schematics of quantum manipulation operations for generating and transforming physical quantum representations of multi-dimensional tensor data objects, in accordance with various example embodiments of the present disclosure.

Figure 7A:
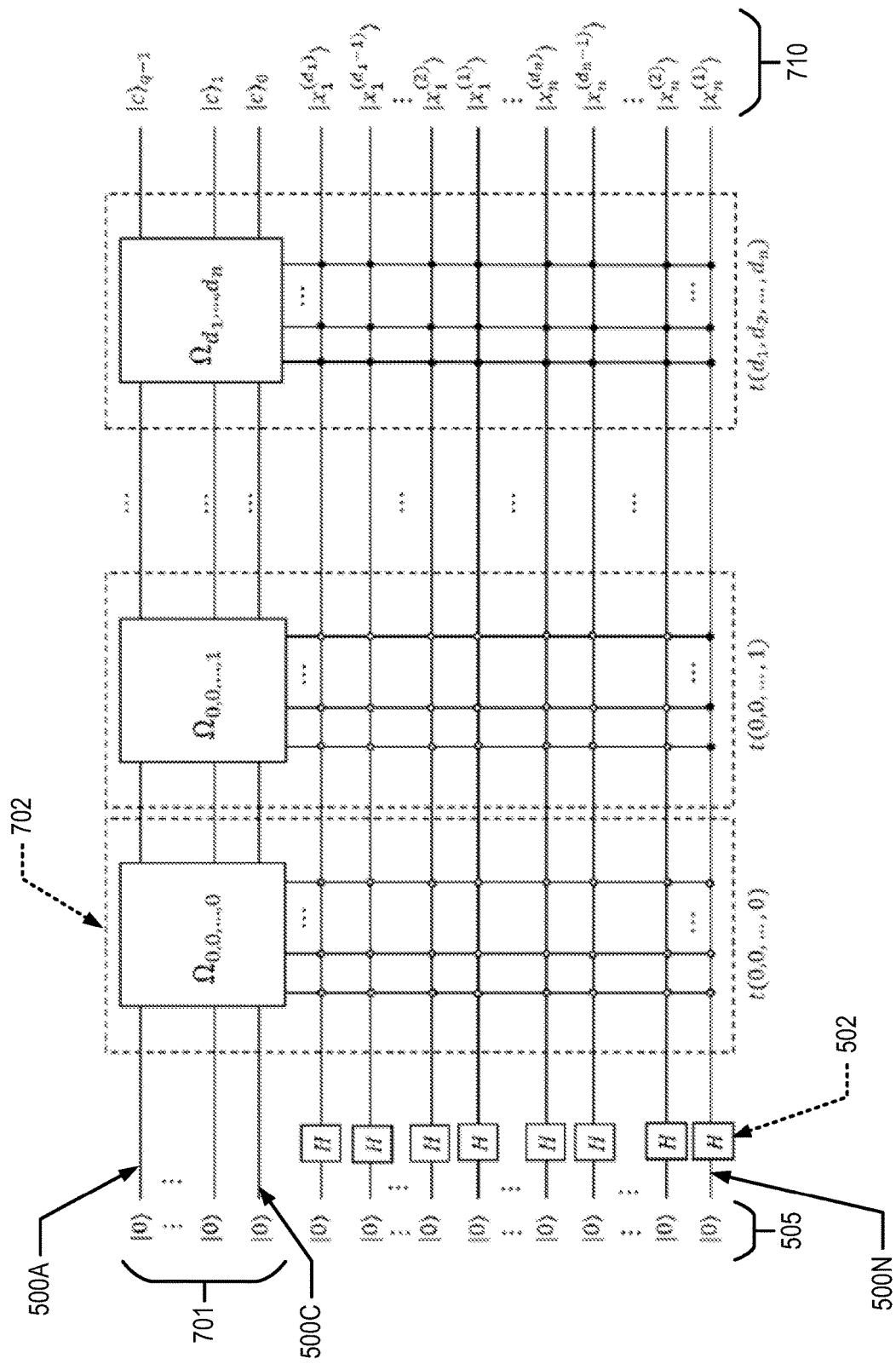
Figure 7B:
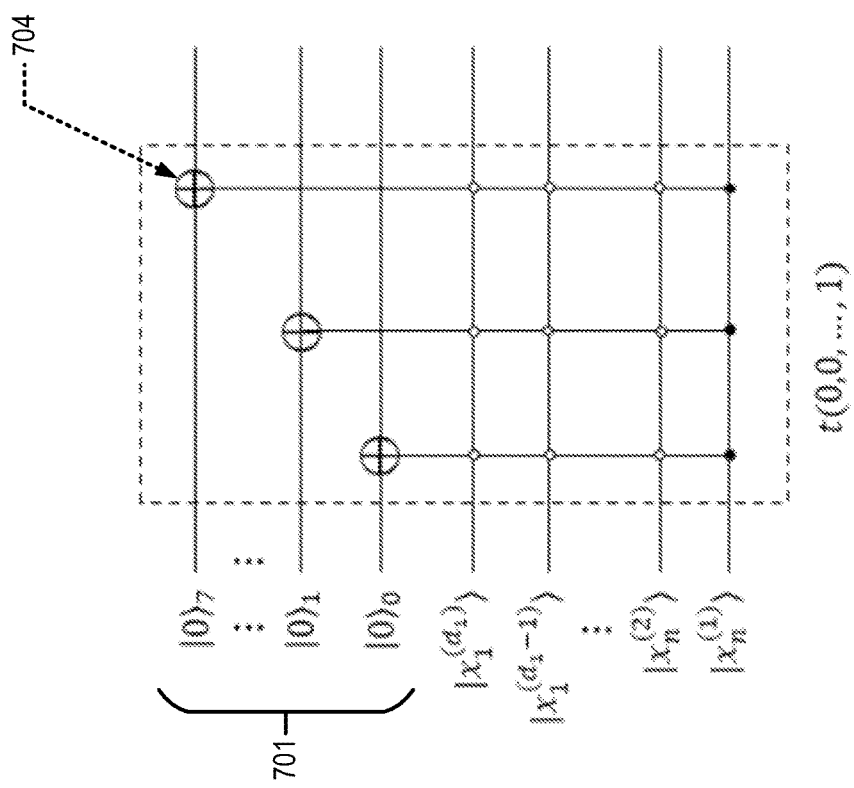
Figure 7C:
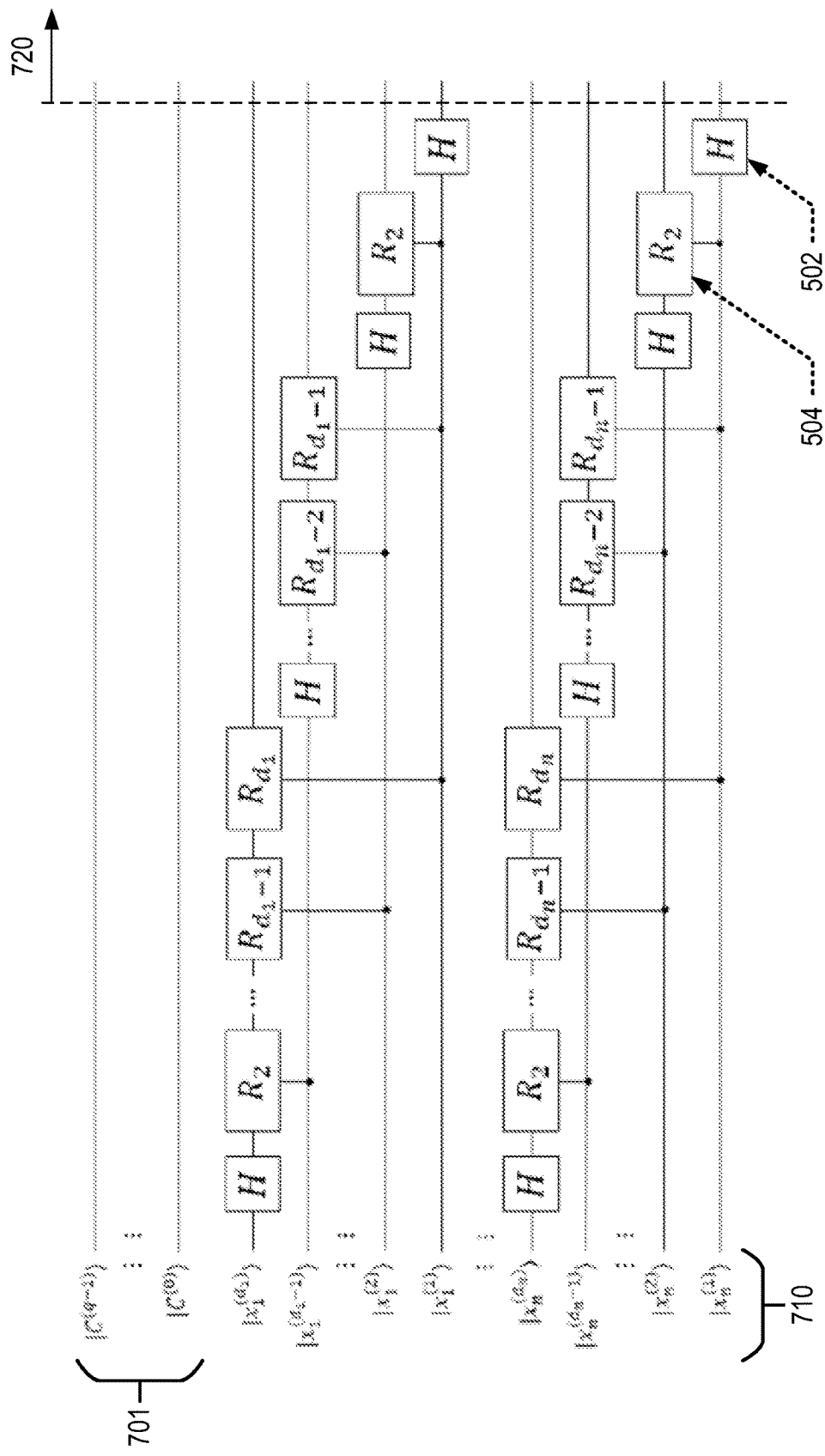

FIGS. 7A-C illustrate various schematics of quantum manipulation operations for generating and transforming physical quantum representations of multi-dimensional tensor data objects, in accordance with various example embodiments of the present disclosure.

Figure 8:
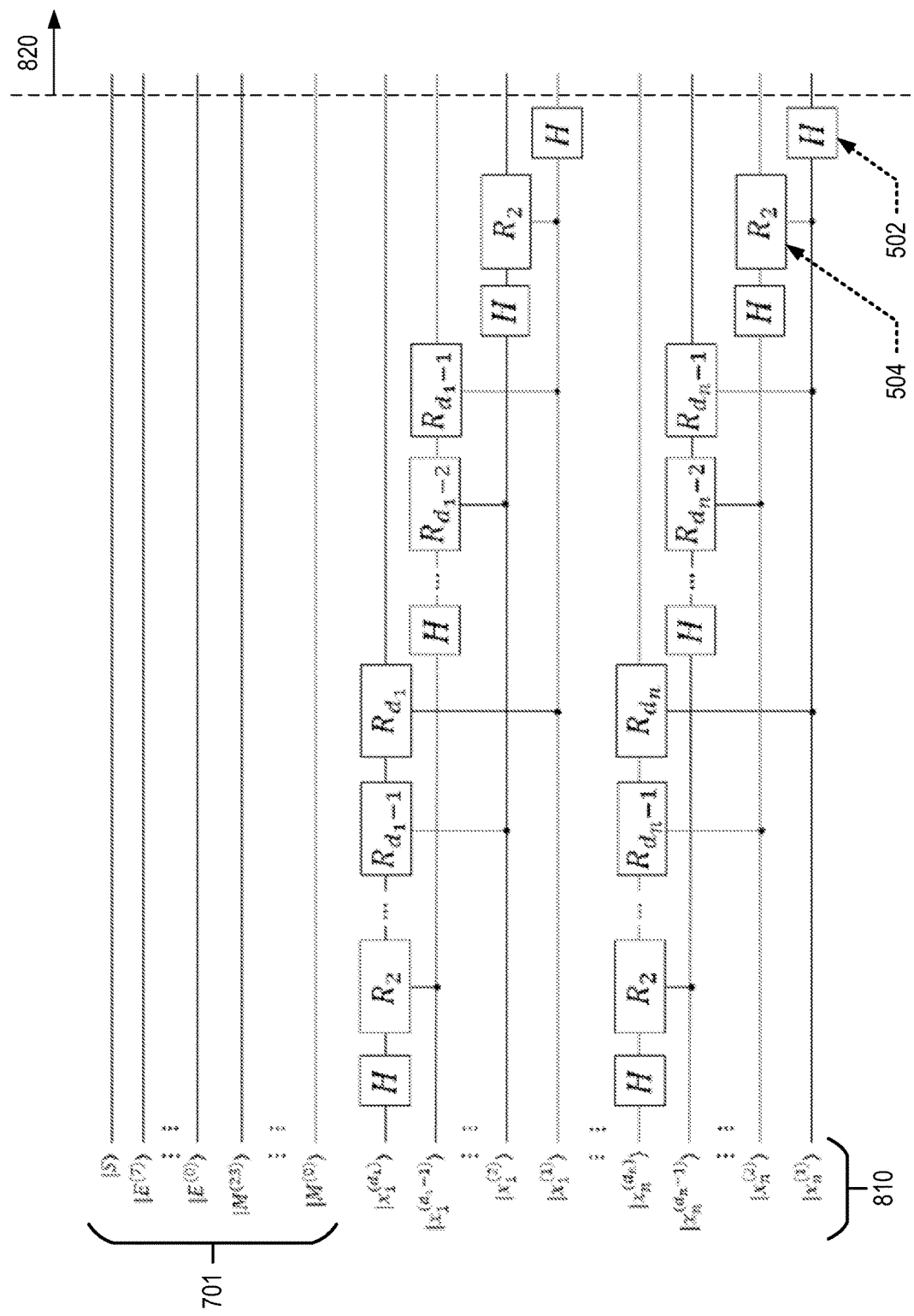

FIG. 8 illustrates various schematics of quantum manipulation operations for generating and transforming physical quantum representations of multi-dimensional tensor data objects, in accordance with various example embodiments of the present disclosure.

Figure 9:
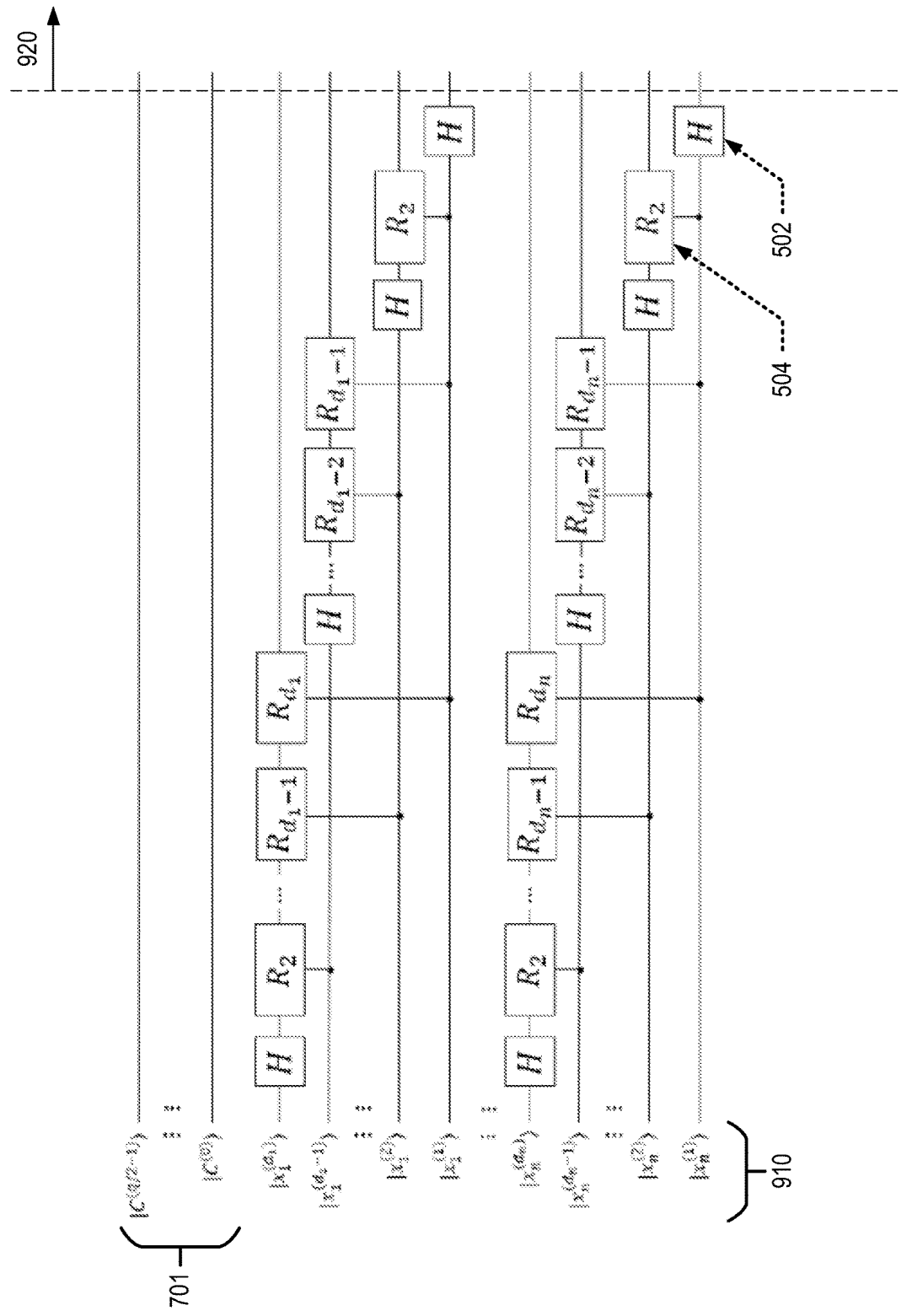

FIG. 9 illustrates various schematics of quantum manipulation operations for generating and transforming physical quantum representations of multi-dimensional tensor data objects, in accordance with various example embodiments of the present disclosure.

DETAILED DESCRIPTION OF SOME EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. General Overview and Technical Advantages

Various embodiments of the present disclosure are directed to controlling a quantum computing system (e.g., a superconducting quantum computing system, a photonic-based quantum computing system, an optical-lattice quantum computing system, a trapped ion quantum computing system, a simulated quantum computing system within a classical computing system, and/or the like) to generate and transform physical quantum representations of multi-dimensional tensor data objects. In various embodiments, physical quantum representations may be generated and transformed to represent the Fourier transform of an input multi-dimensional tensor data object. Specifically, various embodiments describe quantum manipulation operations to efficiently and rapidly transform a first physical quantum representation of the input multi-dimensional tensor data object into a second physical quantum representation of the multi-dimensional discrete Fourier transform of the input multi-dimensional tensor data object.

Such quantum manipulation operations and overall techniques for representing the multi-dimensional discrete Fourier transform of an input multi-dimensional tensor data object are significantly advantageous due at least to the conservation of processing time and resources. In the classical computing field, Fourier transform techniques, such as the FFT algorithm, can be performed efficiently due to all of the data of an input multi-dimensional tensor data object being encoded in classical bits. However, in the quantum computing field, such Fourier transform techniques are not directly applicable due to the nature of qubit encoding of data. Thus, in various embodiments, methods for controlling a quantum computing system and including quantum manipulation operations to perform a Fourier transform technique in the quantum computing field are provided. Such quantum manipulation operations may also be performed in parallel for different portions of a physical quantum representation of the input multi-dimensional tensor data object. For example, a first plurality of qubit atomic entities encoding the position information and the signal intensity of the input multi-dimensional tensor data object along a first dimension may be manipulated parallel to a second plurality of qubit atomic entities encoding the position information and the signal intensity of the input multi-dimensional tensor data object along a second dimension. Accordingly, various embodiments of the present disclosure may be capable of determining a Fourier transform of an input multi-dimensional tensor data object in a more efficient manner than any Fourier transform technique in a classical computing system. Specifically, in various embodiments, the Fourier transform of an input multi-dimensional tensor $t \in \mathbb{C}^{2^{d_1} \times 2^{d_2} \times \ldots 2^{d_n}}$ may be obtained at a time complexity of $\mathcal{O}(E_{i=1}^n d_i^2)$ Various embodiments of the present disclosure describe methods for controlling a quantum computing system and including quantum manipulation operations that may be applied to different quantum representation forms for a multi-dimensional tensor data object. Due to the flexibility and the infinite number of bases possible using qubit atomic entities, more than one quantum representation form may be capable of encoding a multi-dimensional tensor data object. Each quantum representation form may have its own inherent advantages and disadvantages and may therefore be used in different data processing applications. In any regard however, various embodiments of the present disclosure may be used in any application for any quantum representation form. Thus, various embodiments are advantageously flexible and broad in application. It follows then that various embodiments may then be advantageously modularized and included in higher-level applications or algorithms without concern with regard to possibly different quantum representation forms.

II. Exemplary Definitions

The term "multi-dimensional tensor data object" may refer to a data value, data object, data structure, and/or the like configured to describe discrete and/or structured data in more than one dimension. A multi-dimensional tensor data object may specifically describe, represent, encode, and/or the like an nth order tensor. For example, a multi-dimensional tensor data object may be and/or describe a second order tensor such as an image, a third order tensor such as a point cloud, and/or the like.

The term "qubit atomic entity" may refer to a physical object configured to encode, store, representation, and/or the like information. Multiple qubit atomic entities may be used together to encode, store, represent, and/or the like information of magnitude. In a conceptually similar manner to a classical computing bit, a qubit atomic entity may encode, store, represent, and/or the like information using a two-state basis. Thus, a qubit atomic entity may be a two-state or two-level quantum-mechanical physical object. Examples of qubit atomic entities may include an electron, an ion, a photon, and/or the like. As understood then, qubit atomic entities may be of an atomic scale in size. A qubit atomic entity may be in a coherent superposition of two states simultaneously. As such, a qubit atomic entity may encode, store, represent, and/or the like based at least in part on a probability of each state in the superposition of the qubit atomic entity.

The term "quantum manipulation operation" may refer to a physical action performed on one or more qubit atomic entities to manipulate a state or superposition of one or more qubit atomic entities. Quantum manipulation operations may also be understood or described as quantum gates. The physical action of a quantum manipulation operation on a qubit atomic entity may be described mathematically using matrix multiplication. For example, a quantum manipulation operation on a single qubit atomic entity may be described using a 2×2 matrix multiplied with a matrix describing the initial state(s) of the qubit atomic entity to output the manipulated state(s) of the qubit atomic entity. Quantum manipulation operations may be reversible; that is, another quantum manipulation operation may be performed on a manipulated qubit atomic entity to return the qubit atomic entity to an initial state(s). A quantum manipulation operation may be a physical action performed on a single qubit atomic entity or may be a physical action performed on multiple qubit atomic entities.

The term "physical quantum representation" may refer to a configuration, arrangement, combination, and/or the like of qubit atomic entity states to encode, store, represent, and/or the like information. A physical quantum representation of some information may involve one or more qubit atomic entities. One or more qubit atomic entities may be manipulated into a physical quantum representation using quantum manipulation operations. In the present disclosure, a physical quantum representation may refer to a configuration of qubit atomic entity states to encode, store, represent, and/or the like multi-dimensional data.

The term "quantum representation form" may describe a structured form, paradigm, model, and/or the like for physical quantum representations. That is, a quantum representation form may describe the encoded meaning of the qubit atomic entity states of a physical quantum representation. For example, a physical quantum representation of a first quantum representation form may encode a first portion of information using a first number of qubit atomic entities and a second portion of information using a second number of qubit atomic entities, while a physical quantum representation of a second quantum representation form may encode information differently by encoding the second portion of information using the first number of qubit atomic entities. It may be understood then that a quantum representation form assigns meaning to a physical quantum representation.

III. Exemplary Computer Program Products

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 provides a schematic diagram of an example system architecture 100 comprising a quantum system 40 used as a quantum processor, in accordance with an example embodiment. In various embodiments, the system architecture 100 comprises a system computing entity 10 and an example quantum computing system 110. In various embodiments, the quantum computing system 110 comprises a controller 30, a quantum system 40 comprising a plurality of quantum bits (qubits), and one or more manipulation sources 60 for performing quantum manipulation operations. In various embodiments, the plurality of qubits may be embodied or manifested via the physical states of a plurality of qubit atomic entities. In an example embodiment, the one or more manipulation sources 60 may comprise one or more lasers (e.g., optical lasers, microwave sources, and/or the like), one or more voltage sources, one or more magnetic field generators, and/or the like. In various embodiments, the one or more manipulation sources 60 are configured to manipulate and/or cause a controlled quantum state evolution of one or more qubits of the quantum system 40. For example, in an example embodiment, wherein the one or more manipulation sources 60 comprise one or more lasers, the lasers may provide one or more laser beams 66 that are incident on qubit atomic entities of the quantum system 40. In an example embodiment, wherein the one or more manipulation sources 60 comprise one or more voltage sources and/or magnetic field generators, the voltage sources and/or magnetic field generators provide voltage signals (e.g., via one or more electrical leads 68) and/or magnetic fields, respectively, that affect the qubit atomic entities of the quantum system 40.

In various embodiments, a system computing entity 10 is configured to allow a user to provide input to the quantum computing system 110 (e.g., via a user interface of the system computing entity 10) and receive, view, and/or the like output from the quantum computing system 110. The system computing entity 10 may be in communication with the controller 30 of the quantum computing system 110 via one or more wired or wireless networks 20 and/or via direct wired and/or wireless communications. In an example embodiment, the system computing entity 10 may translate, configure, format, and/or the like information/data, quantum computing algorithms, and/or the like into a computing language, executable instructions, command sets, and/or the like that the controller 30 can understand, execute, process, and/or implement. Likewise, the system computing entity 10 may translate, configure, format, and/or the like information/data, commands, quantum computation results, and/or quantum information provided by the controller 30 into information/data that the system computing entity 10 can understand, execute, process, and/or implement.

In various embodiments, the controller 30 is configured to control the manipulation sources 60, and/or other systems in various forms of communication with the quantum system 40 (e.g., configured to provide input to the quantum system 40 to affect one or more qubit atomic entities and/or configured to receive output generated by the quantum system 40 so as to read the state of one or more qubit atomic entities of the quantum system 40). In various embodiments, the qubits are trapped ions, Josephson junctions, spin of a quantum particle or object, and/or the like.

Referring now to FIG. 2, an example controller 30 for a quantum computing system 110 is illustrated. In various embodiments, the controller 30 is configured to control various elements of the quantum computing system 110. For example, the controller 30 may be configured to control the manipulation sources 60, and/or other systems in various forms of communication with the quantum system 40 (e.g., configured to provide input to the quantum system 40 to affect one or more qubit atomic entities and/or configured to receive input generated by the quantum system so as to read the state of one or more qubit atomic entities of the quantum system 40).

As shown in FIG. 2, in various embodiments, the controller 30 may comprise various controller elements including processing elements 205, non-volatile and/or volatile memory 210, driver controller elements 215, a communication interface 220, analog-digital converter elements 225, and/or the like. For example, the processing elements 205 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. The term circuitry may refer to an entirely hardware embodiment or a combination of hardware and computer program products.

For example, the memory 210 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 210 may store qubit records corresponding the qubits of quantum computing system 110 (e.g., in a qubit record data store, qubit record database, qubit record table, and/or the like), a calibration table, an executable queue, computer program code (e.g., in a one or more computer languages, specialized controller language(s), and/or the like), and/or the like. In an example embodiment, execution of at least a portion of the computer program code stored in the memory 210 (e.g., by a processing element 205) causes the controller 30 to perform one or more steps, operations, processes, procedures and/or the like for performing one or more quantum computations using the quantum system 40.

In various embodiments, the driver controller elements 215 may include one or more drivers and/or controller elements each configured to control one or more drivers. In various embodiments, the driver controller elements 215 may comprise drivers and/or driver controllers. For example, the driver controllers may be configured to cause one or more corresponding drivers to be operated in accordance with executable instructions, commands, and/or the like executed by the controller 30 (e.g., by the processing element 205). In various embodiments, the driver controller elements 215 may enable the controller 30 to operate the manipulation sources 60. In various embodiments, the drivers are configured to control the operation of the manipulation sources 60. In various embodiments, the controller 30 comprises means for communicating and/or receiving signals from one or more components configured to receive signals generated by the qubits of the quantum system and/or otherwise read the quantum state of one or more qubit atomic entities.

In various embodiments, the controller 30 may comprise a communication interface 220 for interfacing and/or communicating with a system computing entity 10. For example, the controller 30 may comprise a communication interface 220 for receiving executable instructions, command sets, and/or the like from the system computing entity 10 and providing output received from the quantum computing system 110 and/or the result of a processing the output to the system computing entity 10. In various embodiments, the system computing entity 10 and the controller 30 may communicate via a direct wired and/or wireless connection and/or one or more wired and/or wireless networks 20.

V. Exemplary System Computing Entity

FIG. 3 provides an illustrative schematic representative of a system computing entity 10 that can be used in conjunction with embodiments of the present disclosure. For instance, the system computing entity 10 may communicate (e.g., transmit commands, receive data) with the quantum computing system 110 within the system architecture 100 previously described in FIG. 1. The system computing entity 10 may also interface with a user, who may input or provide a multi-dimensional tensor data object in order to obtain (via the system computing entity 10) a Fourier transform of the multi-dimensional tensor data object. In various embodiments, the system computing entity 10 is configured to determine various quantum manipulation operations for generating and transforming a physical quantum representation of a multi-dimensional tensor data object, and communicate such various quantum manipulation operations to the controller 30 to cause qubit atomic entities of the quantum computing system 110 to be manipulated.

In various embodiments, the system computing entity 10 may comprise and/or may communicate with a simulated quantum computing system. In such embodiments, the simulated quantum computing system may be a computational environment in which qubit atomic entities are represented or simulated, quantum manipulation operations may be virtually performed to alter the state of the qubit atomic entities, and/or the like. Thus, the simulated quantum computing system may have substantially similar functionality to the quantum computing system 110. As such, the system computing entity 10 may be configured to provide a multi-dimensional tensor data object to a simulated quantum computing system for the simulated quantum computing system to generate or simulate a first physical quantum representation of the multi-dimensional tensor data object, communicate quantum manipulation operations to the simulated quantum computing system for the simulated quantum computing system to simulate alterations and manipulations of the state of qubit atomic entities, and retrieve simulated outputs from the simulated quantum computing system that may represent the Fourier transform of the multi-dimensional tensor data object.

In general, the terms device, system, computing entity, and/or similar words used herein interchangeably can refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the system computing entity 10 can include an antenna 312, a transmitter 304 (e.g., radio), a receiver 306 (e.g., radio), and one or more processing elements 308 that provides signals to and receives signals from the transmitter 304 and receiver 306, correspondingly.

The signals provided to and received from the transmitter 304 and the receiver 306, correspondingly, can include signaling information/data in accordance with air interface standards of applicable wireless systems. In this regard, the system computing entity 10 can be capable of operating with one or more air interface standards, communication protocols, modulation types, and access types. More particularly, the system computing entity 10 can operate in accordance with any of a number of wireless communication standards and protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The system computing entity 120 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

With that said, the system computing entity 10 may be configured in particular embodiments to operate in accordance with multiple wired communication standards and protocols via a network interface 320 instead of or in addition to wireless systems. Here, any one or a combination of different types of suitable communications networks can be used such as, for example, cable networks, public networks, private networks, or any other suitable private and/or public networks. Further, the networks may have any suitable communication range associated therewith and may include, for example, global networks, MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, or any combination thereof, as well as a variety of network devices and computing platforms provided by network providers or other entities. Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol.

In various embodiments, the system computing entity 10 includes or is in communication with one or more processing elements 308 (also referred to as processors, processing circuitry, and/or similar terms used herein interchangeably) that communicate with other elements within the system computing entity 10 via a bus, for example, or network connection. As will be understood, the processing element 308 may be embodied in several different ways. For example, the processing element 308 may be embodied as one or more complex programmable logic devices (CPLDs), microprocessors, multi-core processors, coprocessing entities, application-specific instruction-set processors (ASIPs), and/or controllers. Further, the processing element 308 may be embodied as one or more other processing devices or circuitry. The term circuitry may refer to an entirely hardware embodiment or a combination of hardware and computer program products. Thus, the processing element 308 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 308 may be configured for a particular use or configured to execute instructions stored in volatile or non-volatile media or otherwise accessible to the processing element 308. As such, whether configured by hardware, computer program products, or a combination thereof, the processing element 308 may be capable of performing steps or operations according to embodiments of the present disclosure when configured accordingly.

In various embodiments, the system computing entity 10 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 324 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 324 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium. In particular embodiments, the memory media 324 may also be embodied as a data storage device or devices, as a separate database server or servers, or as a combination of data storage devices and separate database servers.

In various embodiments, the system computing entity 10 may further include or be in communication with volatile media (also referred to as volatile storage, memory, memory storage, memory circuitry and/or similar terms used herein interchangeably). For instance, the volatile storage or memory may also include one or more volatile storage or memory media 322 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 322 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 208. Thus, the databases, database instances, database management system entities, data, images, applications, programs, program modules, scripts, source code, object code, byte code, compiled code, interpreted code, machine code, executable instructions, and/or the like may be used to control certain aspects of the operation of the system computing entity 10 with the assistance of the processing element 308 and operating system. The system computing entity 10 may be configured to download changes, add-ons, and updates, for instance, to its firmware, software (e.g., including executable instructions, applications, program modules), and operating system.

The system computing entity 10 can also comprise a user interface (that can include a display 316 coupled to the processing element 308) and/or a user input interface (coupled to the processing element 308). For example, the user interface can be a user application, browser, user interface, graphical user interface, dashboard, and/or similar words used herein interchangeably executing on and/or accessible via the system computing entity 10 to interact with and/or cause display of information/data. The user input interface can comprise any of a number of devices or interfaces allowing the system computing entity 10 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the system computing entity 10 and can include a full set of alphabetic keys or set of keys that can be activated to provide a full set of alphanumeric keys. In addition to providing input, the user input interface can be used, for example, to activate or deactivate certain functions.

As will be appreciated, one or more of the system computing entity's components may be located remotely from other system computing entity components, such as in a distributed system. Furthermore, one or more of the components may be aggregated and additional components performing functions described herein may be included in the system computing entity 10. Thus, the system computing entity 10 can be adapted to accommodate a variety of needs and circumstances.

VI. Exemplary System Operations

Various embodiments of the present disclosure describe steps, operations, processes, methods, functions, and/or the like for controlling a quantum computing system 110 (e.g., a superconducting quantum computing system, a photonic-based quantum computing system, an optical-lattice quantum computing system, a trapped ion quantum computing system, a simulated quantum computing system within a classical computing system, and/or the like) to generate and transform physical quantum representations of multi-dimensional tensor data objects, such as transforming qubit atomic entities to generate a physical quantum representation of the Fourier transform of a multi-dimensional tensor data object. The steps, operations, processes, methods, functions, and/or the like described herein enable the advantageously efficient representation of the Fourier transform of a multi-dimensional tensor data object upon being provided with the multi-dimensional tensor data object. While methods for obtaining the Fourier transform of a multi-dimensional tensor data object have existed in the classical computing field, such methods are inapplicable, impossible, and/or inefficient in a quantum computing system. Various embodiments of the present disclosure may be more efficient than such classical methods when applied in a quantum computing system and may even be more efficient in a quantum computing system when compared to a classical computing system using such classical methods. Furthermore, various embodiments for obtaining the Fourier transform of a multi-dimensional tensor data object in a quantum computing system are modular in that additional processing operations may be performed before and after obtaining the Fourier transform. Accordingly, various embodiments for obtaining the Fourier transform of a multi-dimensional tensor data object may be advantageously used in processing pipelines and other higher-level applications.

Referring now to FIG. 4, a flowchart is provided. The flowchart illustrates an example process 400 for controlling a quantum computing system 110 to generate and transform physical quantum representations of multi-dimensional tensor data objects and Fourier transforms thereof. In various embodiments, steps of the example process 400 are performed by a system computing entity 10, such as the example system computing entity 10 provided by FIG. 2. For example, system computing entity 10 comprises means, such as processing element 308, memories 322, 324, network interface 320, and/or the like, for performing various operations of the example process 400. In some embodiments, some, or all of the steps of the example process 400 may be performed by a controller 30 of the quantum computing system 110.

As shown, process 400 comprises step 401. In some embodiments, process 400 begins with (e.g., is triggered by) step 401. Step 401 comprises receiving a multi-dimensional Fourier transform operation request. The multi-dimensional Fourier transform operation request comprises a multi-dimensional tensor data object. The multi-dimensional Fourier transform operation request may further comprise an indication of a quantum representation form. In various embodiments, the multi-dimensional Fourier transform operation request may be received via an application programming interface (API). For example, the multi-dimensional Fourier transform operation request may be an API call, query, request, or similar terms used herein interchangeably. In some embodiments, the multi-dimensional Fourier transform operation request is part of higher-level application or operation request. The multi-dimensional Fourier transform may be a step, a module, a component, and/or the like of a processing pipeline, and thus the multi-dimensional Fourier transform operation request may be accompanied by requests for other operations. For example, the multi-dimensional Fourier transform operation request may be a part of a high-level application request requesting that a processing pipeline including the multi-dimensional Fourier transform and subsequent frequency domain/space filtering be executed or performed via the quantum computing system 110.

Tensor Quantum Representation Forms

As described, the multi-dimensional Fourier transform operation request may comprise an indication of a particular quantum representation form in which to represent the multi-dimensional tensor data object. The indicated quantum representation form may also be later used to represent the Fourier transform of the multi-dimensional tensor data object. In various embodiments, the indicated quantum representation form of the multi-dimensional Fourier transform operation request may have been selected by a user (e.g., via a user interface of the system computing entity 10, via a client computing entity in communication with the system computing entity 10).

Various embodiments of the present disclosure provide technical advantages in that any physical quantum representation of any quantum representation form may be transformed to represent the Fourier transform of the multi-dimensional tensor data object. Various different quantum representation forms may be used to encode the multi-dimensional tensor data object in the overall state of the plurality of qubit atomic entities for different tasks and applications, and each quantum representation form may have inherent advantages and disadvantages with regard to different tasks and applications. The present disclosure describes six example quantum representation forms: (i) Flexible Representation of Quantum Images (FRQI), (ii) normal arbitrary quantum superposition state (NAQSS), (iii) generalized Novel Enhanced Quantum Representation (GNEQR), (iv) Caraiman's Quantum Image Representation (CQIR), (v) quantum representation of real-valued digital signals (QRDS), and (vi) Improved FRQI (IFRQI). Each quantum representation form may encode information for the multi-dimensional tensor data object in a different manner or configuration of qubit atomic entities. For example, the FRQI and NAQSS quantum representation forms encode intensity or signal value information of the multi-dimensional tensor data object (e.g., data values at each element of a multi-dimensional tensor) in probability amplitudes of qubit atomic entities, while the GNEQR, CQIR, and QSR encode intensity or signal value information of the multi-dimensional tensor data object in a basis composed of the quantum states of qubit atomic entities. The IFRQI quantum representation form uses both probability amplitudes and the quantum states of qubit atomic entities to encode intensity or signal value information. It will be understood that these example quantum representation forms are not intended to be limiting as to the scope of the present disclosure and that other quantum representation forms may be applied within the various embodiments of the present disclosure.

The FRQI quantum representation form may use the quantum states of the qubit atomic entities to encode position information of the multi-dimensional tensor data object and the probability amplitudes of the qubit atomic entities to encode intensity information. In some embodiments, the intensity information encoded may specifically be normalized color information. Thus, the FRQI quantum representation form embeds the intensity (e.g., grayscale/color value) and pixel position using the plurality of qubit atomic entities, similar to or inspired by the storage methods in a classical computer. For a multi-dimensional tensor $t \in \mathbb{C}^{2^{d_1} \times 2^{d_2} \times \ldots \times 2^{d_n}}$, the FRQI quantum representation form may be defined as:

$$|\phi_{FRQI}\rangle = \frac{1}{\sqrt{2\sum_{i=1}^{n} d_i}} \sum_{x_1=0}^{2^{d_1}-1} \ldots \sum_{x_n=0}^{2^{d_n}-1} |c_{x_1,\ldots,x_n}\rangle \otimes |x_1\rangle \ldots |x_n\rangle$$

where $|c_{x_1,\ldots,x_n}\rangle = \cos\theta_{x_1,\ldots,x_n}|0\rangle + \sin\theta_{x_1,\ldots,x_n}|1\rangle$ and $\theta_{x_1,\ldots,x_n} = \frac{t(x_1,\ldots,x_n)\pi}{2(M-1)}$.

In the above equations, M describes the intensity range of the multi-dimensional tensor (e.g., M=256 for an 8-bit image); $\theta_{x_1,\ldots,x_n}$ describes the intensity value at a position $(x_1, \ldots, x_n)$ of the multi-dimensional tensor and satisfies $\theta_{x_1,\ldots,x_n} \in [0, \pi/2]$. To simplify the expression, $|x_i\rangle_\mathbb{C}$ is used for representing a basis of quantum computing system 110 with $d_i$ qubit atomic entities:

$$|x_i\rangle = |x_i^{(d_i)} x_i^{(d_i-1)} \ldots x_i^{(1)}\rangle, \text{ where } x_i = \Sigma_{K=1}^{d_i} x_i^{(k)} 2^{k-1}.$$

In the above equation, $|x_i\rangle_\mathbb{C}$ encodes and embeds the position information of the multi-dimensional tensor, or specifically the index of the $i^{th}$ dimension of t. The FRQI quantum representation form may require D+1 qubit atomic entities, where $D = \Sigma_{i=1}^{n} d_i$. In various embodiments, the system computing entity 10 may be configured to determine a number of qubit atomic entities available to generate a physical quantum representation of the FRQI quantum representation form for the multi-dimensional tensor data object and whether the number of available qubit atomic entities is sufficient for the FRQI quantum representation form. The system computing entity 10 may also indicate to the user if the number of available qubit atomic entities is not sufficient and prompt the user to select a different quantum representation form, in some embodiments. In other embodiments, the system computing entity 10 may automatically select another quantum representation form if the number of available qubit atomic entities is not sufficient for the FRQI quantum representation form.

In various embodiments, the NAQSS quantum representation form may encode a multi-dimensional tensor data object with exponential storage-saving benefits when compared to a classical computing system. Thus, the NAQSS quantum representation form may be particularly advantageous for representing large multi-dimensional tensor data objects. Specifically, the NAQSS quantum representation form may encode a multi-dimensional tensor data object using sub-portions of the multi-dimensional tensor data object (e.g., a R, G, or B color slice of a RGB image). For a multi-dimensional tensor $t \in \mathbb{C}^{2^{d_1} \times 2^{d_2} \times \ldots \times 2^{d_n}}$, the FRQI quantum representation form may be defined as:

$$|\phi_{NAQSS}\rangle = \sum_{x_1=0}^{2^{d_1}-1} \ldots \sum_{x_n=0}^{2^{d_n}-1} a_{x_1,\ldots,x_n} |x_1\rangle \ldots |x_n\rangle \otimes |X_{x_1,\ldots,x_n}\rangle$$

where $a_{x_1,\ldots,x_n} = \frac{\theta_{x_1,\ldots,x_n}}{\sqrt{\sum_{k_1,\ldots,x_n} \theta^2_{x_1,\ldots,x_n}}}$;

$|X_{x_1,\ldots,x_n}\rangle = \cos\gamma_{x_1,\ldots,x_n}|0\rangle + \sin\gamma_{x_1,\ldots,x_n}|1\rangle$; and $\theta_{x_1,\ldots,x_n} = \frac{t(x_1,\ldots,x_n)\pi}{2(M-1)}$.

In the above equations, $\gamma_{x_1,\ldots,x_n}$ corresponds to serial numbers of sub-portions of the multi-dimensional tensor data object. Similar to the FRQI quantum representation form, the NAQSS quantum representation form may require D+1 qubit atomic entities, where $D=\Sigma_{i=1}{}^n d_i$, to represent the multi-dimensional tensor data object. Also, similarly then, the system computing entity 10 may be configured to determine whether the number of available qubit atomic entities is sufficient for the NAQSS quantum representation form and, if insufficient, notify the end user and/or select a different quantum representation form.

Distinct from the aforementioned quantum representation forms, the GNEQR quantum representation form may use a quantum sequence, or a sequence of qubit atomic entities, to store, encode, represent, and/or the like the intensity (e.g., grayscale) information of the multi-dimensional tensor data object. For a multi-dimensional tensor $t \in \mathbb{C}^{2^{d_1} \times 2^{d_2} \times \ldots \times 2^{d_n}}$, the GNEQR quantum representation form may be defined as:

$$|\phi_{GNEQR}\rangle = \frac{1}{\sqrt{2^D}} \sum_{x_1=0}^{2^{d_1}-1} \ldots \sum_{x_n=0}^{2^{d_n}-1} |t(x_1, \ldots, x_n)\rangle \otimes |x_1\rangle \ldots |x_n\rangle$$

where $|t(x_1, \ldots x_n)\rangle = C^{(q-1)} C^{(q-2)} \ldots C^{(0)}\rangle$ and $$t(x_1, \ldots, x_n) = \sum_{k=0}^{q-1} C^{(k)} 2^k$$

In the above equations then, $|t(x_1, \ldots, x_n)\rangle$ is the binary representation of $t(x_1, \ldots, x_n)$. Additionally, q describes the number of qubit atomic entities for storage of intensity information (e.g., q=8 for grayscale values). Accordingly, the GNEQR quantum representation form may require q−1 additional qubit atomic entities to encode the multi-dimensional tensor data object. Similarly then, the system computing entity 10 may be configured to determine whether the number of available qubit atomic entities is sufficient for the GNEQR quantum representation form and, if insufficient, notify the end user and/or select a different quantum representation form (e.g., a quantum representation form requiring less qubits). Despite the higher number of qubit atomic entities required for encoding the multi-dimensional tensor data object, the GNEQR quantum representation form may be more efficient in preparation of the qubit atomic entities. Specifically, less time and resources are needed to manipulate the qubit atomic entities into a physical quantum representation of the GNEQR quantum representation form.

Similar to the GNEQR quantum representation form, the CQIR quantum representation form may use a quantum sequence, or a sequence of qubit atomic entities, to store intensity information. However, the CQIR quantum representation form may have a better storage efficiency than the GNEQR quantum representation form. In the CQIR quantum representation form, intensity information can be encoded based at least in part on the number of intensity levels in the multi-dimensional tensor data object. For a multi-dimensional tensor $t \in \mathbb{C}^{2^{d_1} \times 2^{d_2} \times \ldots \times 2^{d_n}}$, the CQIR quantum representation form may be defined as:

$$|\phi_{CQIR}\rangle = \frac{1}{\sqrt{2^D}} \sum_{x_1=0}^{2^{d_1}-1} \ldots \sum_{x_n=0}^{2^{d_n}-1} |t(x_1, \ldots, x_n)\rangle \otimes |x_1\rangle \ldots |x_n\rangle$$

where $|t(x_1, \ldots x_n)\rangle = C^{(q-1)} C^{(q-2)} \ldots C^{(0)}\rangle$ and $$t(x_1, \ldots, x_n) = \sum_{k=0}^{q-1} C^{(k)} 2^k$$

While the above equations are similar to the ones defining the GNEQR quantum representation form, q is instead defined in the CQIR quantum representation form based at least in part on the number of intensity levels in the multi-dimensional tensor data object. Specifically, $q = \log_2 L$, where L is the number of intensity (e.g., grayscale) levels in the multi-dimensional tensor data object. Thus, the CQIR quantum representation form may require a fewer number of qubit atomic entities to store, encode, represent, and/or the like the multi-dimensional tensor data object. As aforementioned, the system computing entity 10 may be configured to determine whether the number of available qubit atomic entities is sufficient for the CQIR quantum representation form. Due to the storage efficiency (e.g., fewer number of required qubit atomic entities), the system computing entity 10 may select the CQIR quantum representation form instead of another quantum representation form when fewer qubit atomic entities are available. In various embodiments, the CQIR quantum representation form may be particularly advantageous and efficient in histogram computation.

While the aforementioned quantum representation forms are ideal for multi-dimensional tensor data objects with integer intensity values, the QRDS quantum representation form is applicable for any real-valued intensity values. The QRDS quantum representation form may use three quantum sequences (e.g., sequences of qubit atomic entities) to represent floating numbers. For example, a first quantum sequence ($|S\rangle$) represents a sign bit, a second quantum sequence ($|E\rangle$) represents an exponent, and a third quantum sequence ($|M\rangle$) represents a mantissa. For a multi-dimensional tensor $t \in \mathbb{C}^{2^{d_1} \times 2^{d_2} \times \ldots \times 2^{d_n}}$, the QRDS quantum representation form may be defined as:

$$|\phi_{QRDS}\rangle = \frac{1}{\sqrt{2^D}} \sum_{x_1=0}^{2^{d_1}-1} \ldots \sum_{x_n=0}^{2^{d_n}-1} |t(x_1, \ldots, x_n)\rangle \otimes |x_1\rangle \ldots |x_n\rangle$$

where $|t(x_1, \ldots x_n)\rangle = |S(x_1, \ldots x_n)\rangle |E(x_1, \ldots, x_n)\rangle |M(x_1, \ldots x_n)\rangle$.

In the classical computing field, the number of classical bits used for the sign is one, the number of classical bits used for the exponent is eight, and the number of classical bits used for the mantissa is 23. Similarly then, the number of qubit atomic entities required for representation of the intensity information as floating numbers is 32. Overall, the QRDS quantum representation form then requires D+32 qubit atomic entities, where $D=\Sigma_{i=1}{}^n d_i$.

Next, the IFRQI quantum representation form may store the intensity information of the multi-dimensional tensor data object in both probability amplitude and a quantum sequence. For a multi-dimensional tensor $t \in \mathbb{C}^{2^{d_1} \times 2^{d_2} \times \ldots \times 2^{d_n}}$, the IFRQI quantum representation form may be defined as:

$$|\phi_{IFRQI}\rangle = \frac{1}{\sqrt{2^D}} \sum_{x_1=0}^{2^{d_1}-1} \ldots \sum_{x_n=0}^{2^{d_n}-1} |t(x_1, \ldots, x_n)\rangle \otimes |x_1\rangle \ldots |x_n\rangle$$

where $|t(x_1, \ldots x_n)\rangle = \bigotimes_{k=0}^{\frac{q}{2}-1} (\cos\theta^{(k)}_{x_1,\ldots,x_n} |0\rangle + \sin\theta^{(k)}_{x_1,\ldots,x_n} |1\rangle)$.

In the above equations, q describes the number of qubit atomic entities for storage of intensity information, and $\theta^{(k)}_{x_1,\ldots,x_n} = C^{(2k+1)} C^{(2k)}$. The IFRQI quantum representation form may be understood as a combination of the FRQI quantum representation form and the NEQR quantum representation form. The IFRQI quantum representation form may require $$D + \frac{q}{2}$$

qubit atomic entities, where $D=\Sigma_{i=1}^{n}d_i$, for representation of the multi-dimensional tensor data object. Again, the system computing entity 10 may be configured to determine whether the number of available qubit atomic entities is sufficient for the CQIR quantum representation form, and accordingly notify the user and/or select a different quantum representation form if the available qubit atomic entities are insufficient.

Returning to process 400 then, step 402 comprises determining one or more first quantum manipulation operations for a first physical quantum representation of the multi-dimensional tensor data object based at least in part on the multi-dimensional Fourier transform operation request including an indication of a quantum representation form. In various embodiments, the first quantum manipulation operations are different depending on the indicated quantum representation form, and different qubit atomic entities may be subjected to the first quantum manipulation operations depending on the indicated quantum representation form.

In various embodiments, the system computing entity 10 and/or the controller 30 is configured to determine one or more first quantum manipulation operations for a first physical quantum representation of the indicated quantum representation form for the multi-dimensional tensor data object. For example, the system computing entity 10 and/or the controller 30 may be configured to retrieve from memories 210, 322, 324 or reference within memories 210, 322, 324 various quantum manipulation operations and/or sequences of quantum manipulation operations relevant to a quantum representation form. In various embodiments, the system computing entity 10 and/or the controller 30 may store and/or manage a quantum manipulation operation queue to which first quantum manipulation operations may be added. The system computing entity 10 and/or the controller 30 may be further configured to determine additional parameters for each determined first quantum manipulation operations, such as a location of a subject qubit atomic entity (e.g., within a specific portion of the atomic entity trap apparatus and/or package 50), one or more manipulation sources 60 to use for the first quantum manipulation operations, relative and/or absolute timing of each first quantum manipulation operation, and/or the like. In some embodiments, determining the one or more first quantum manipulation operations may comprise simulating the one or more first quantum manipulation operations within a controlled simulated (e.g., computer-aided) environment.

At step 403, the first physical quantum representation is then generated by manipulating a plurality of qubit atomic entities based at least in part on the one or more first quantum manipulation operations. In various embodiments, the one or more first quantum manipulation operations may be executed or performed based at least in part on various parameters determined by the system computing entity 10 and/or the controller 30. For example, each of the one or more first quantum manipulation operations may be executed by one or more determined manipulation sources 60 (e.g., via a laser beam 66) on one or more particular qubit atomic entities at a specific timepoint within an operational time course. In some embodiments, the system computing entity 10 and/or the controller 30 store, manage, and/or use a quantum manipulation operation queue such that the one or more first quantum manipulation operations are executed or performed in the quantum computing system 110 in a specific sequence and/or at specific timepoints within an operational time course.

As previously described, quantum manipulation operations may be unique for each quantum representation form. According to various embodiments of the present disclosure, the first quantum manipulation operations may first transform an all-zero state $|\phi\rangle_0$ of the plurality of qubit atomic entities to an intermediate state $|\phi\rangle_1$ encoding the position information of the multi-dimensional tensor data object, and then adding intensity information (e.g., signal value information) to each encoded position of the multi-dimensional tensor data object. As such, in various embodiments, generating the first physical quantum representation may be preceded by initializing the plurality of qubit atomic entities to an all-zero state $|\phi\rangle_0$.

In some embodiments, the FRQI quantum representation form may require D+1 qubit atomic entities for representation of a multi-dimensional tensor $t \in \mathbb{C}^{2^{d_1} \times 2^{d_2} \times \ldots \times 2^{d_n}}$, where $D=\Sigma_{i=1}^{n}d_i$, as introduced above. Thus, the initial all-zero state may be described as $|\phi\rangle_0 = |0\rangle^{\otimes D+1}$ Based at least in part on a two-step strategy of first encoding position information followed by encoding intensity information, the all-zero state is transformed into the intermediate state $|\phi\rangle_1$ with the transformation $\mathcal{H} = I \otimes H^{\otimes D}$. In this transformation, I describes the identity matrix, while H describes the Hadamard quantum manipulation operation (or Hadamard gate), which is defined as $$H = \frac{1}{\sqrt{2}} \begin{bmatrix} 1 & 1 \\ 1 & -1 \end{bmatrix}.$$

Thus, the intermediate state is defined accordingly:

$$|\phi\rangle_1 = \mathcal{H}|\phi\rangle_0 = \frac{1}{\sqrt{2^D}}|0\rangle \otimes \sum_{x_1=0}^{2^{d_1}-1} \ldots \sum_{x_n=0}^{2^{d_n}-1} |x_1\rangle \ldots |x_n\rangle$$

A physical quantum representation of the FRQI quantum representation form may then be achieved using controlled rotation quantum manipulation operations (controlled rotation, or CROT, gates) on the intermediate state. The controlled rotation quantum manipulation operations are defined as such:

$$CROT_{x_1^*,\ldots,x_n^*} = I \otimes \sum_{x_1,\ldots,x_n \neq x_1^*,\ldots,x_n^*} |x_1 \ldots x_n\rangle$$

$$\langle x_1 \ldots x_n| + R_y(\theta_{x_1^*,\ldots,x_n^*}) \otimes |x_1^*, \ldots x_n^*\rangle\langle x_1^*, \ldots x_n^*|$$

In the above equations, $R_y(\theta_{x_1,\ldots,x_n})$ is defined as a rotation matrix about the $\hat{y}$ axis of a qubit atomic entity. The $CROT_{x_1^*,\ldots,x_n^*}$ quantum manipulation operations, or gates, add the intensity or signal value information of positions $(x_1^*, \ldots, x_n^*)$ to the intermediate state of the plurality of qubit atomic entities. Thus, the application of the CROT quantum manipulation operations or gates to the intermediate state may be defined as such:

$$CROT_{x_1^*,\ldots,x_n^*}|\phi\rangle_1 = \frac{1}{\sqrt{2^D}}[|0\rangle \otimes \sum_{x_1,\ldots,x_n \neq x_1^*,\ldots,x_n^*} |x_1 \ldots x_n\rangle +$$
$$(\cos\theta_{x_1^*,\ldots,x_n^*}|0\rangle + \sin\theta_{x_1^*,\ldots,x_n^*}|1\rangle) \otimes |x_1^*, \ldots x_n^*\rangle]$$

which may be described by the following process:

$$|\phi_{FRQI}\rangle = \left(\prod_{x_1,\ldots,x_n} CROT_{x_1,\ldots,x_n}\right)|\phi\rangle_1$$

FIG. 5A provides a quantum circuit corresponding to the above process of applying CROT quantum manipulation operations or gates to generate a first physical quantum representation of the FRQI quantum representation form for a multi-dimensional tensor data object. The visualization provided in FIG. 5A illustrates a plurality of lines, each representing one qubit atomic entity 500. As shown in the visualization, the plurality of qubit atomic entities 500 are initialized in an all-zero state 505 (e.g., each qubit atomic entity 500 having the state |0⟩. To reach the intermediate state |ϕ⟩₁, Hadamard gates 502 (or Hadamard quantum manipulation operations) are applied to D number of qubit atomic entities 500 to encode position information for the multi-dimensional tensor data object.

Subsequently, one or more CROT gates 504 (or CROT quantum manipulation operations) are applied to a first qubit atomic entity 500A using each of the qubit atomic entities 500 (e.g., qubit atomic entities 500B-N) that encode position information for the multi-dimensional tensor data object (and manipulated via Hadamard gates 502). The CROT gates 504 may encode intensity or signal value information for each encoded position of the multi-dimensional tensor data object into the first qubit atomic entity 500A. The number of CROT gates 504 applied to the qubit atomic entities 500 may be dependent on the size of each dimension of the multi-dimensional tensor data object. As shown, different CROT gates 504 controlled by different qubit atomic entities 500 or combinations of different qubit atomic entities 500 are executed or performed sequentially. After applying the CROT gates 504, a first physical quantum representation 510 of the FRQI quantum representation form for the multi-dimensional tensor data object is generated. Specifically, in the first physical quantum representation 510 of the FRQI quantum representation form, a first qubit atomic entity 500A encodes intensity or signal value information of the multi-dimensional tensor data object while a number of qubit atomic entities 500 (e.g., 500B-500N) encode the position information of the multi-dimensional tensor data object. Within the number of qubit atomic entities 500 (e.g., 500B-500N) encoding the position information, a first subset of qubit atomic entities 500 may specifically encode position information for a first dimension of the multi-dimensional tensor data object, a second subset of qubit atomic entities may specifically encode position information for a second dimension of the multi-dimensional tensor data object, and so on.

The NAQSS quantum representation form may also require D+1 qubit atomic entities 500 for encoding of a multi-dimensional tensor data object. The NAQSS quantum representation form may store both intensity information and image segmentation information. However, different from the FRQI quantum representation form, preparation of the NAQSS quantum representation form involves the transformation $\mathcal{R}$ to convert the initial all-zero state $|\phi\rangle_0$ to the intermediate state $|\phi\rangle_1$. The transformation $\mathcal{R}$ embeds the intensity or signal value information into the intermediate state $|\phi\rangle_1$ and is defined as such:

$$|\phi\rangle_1 = \mathcal{R}|\phi\rangle_0 = \sum_{x_1=0}^{2^{d_1}-1} \ldots \sum_{x_n=0}^{2^{d_n}-1} a_{x_1,\ldots,x_n}|x_1 \ldots x_n\rangle \otimes |0\rangle$$

FIG. 6A illustrates a quantum circuit corresponding to generating a first physical quantum representation of the NAQSS quantum representation form for a multi-dimensional tensor data object. Each line of the plurality of illustrated lines represents a qubit atomic entity 500, and the plurality of qubit atomic entities 500 are initialized in an all-zero state 505. The CROT gates 504 here involve rotation about the $\hat{x}$ axis of a qubit atomic entity 500, which is defined by the following matrix.

$$R_x(\alpha) = \begin{bmatrix} \cos\alpha & \sin\alpha \\ \sin\alpha & -\cos\alpha \end{bmatrix}$$

The $\alpha$ value in the above matrix defining the CROT gate 504 for the NAQSS quantum representation form may be dependent on different quantum states. The different quantum states $|x_1, \ldots, x_n\rangle$ are represented with $|i_1, \ldots, i_D\rangle$ and the $\alpha$ values are further defined below:

$$\alpha_1 = \arctan\sqrt{\frac{\sum_{i_2 \ldots i_D} |a_{1i_2 \ldots i_D}|^2}{\sum_{i_2 \ldots i_D} |a_{0i_2 \ldots i_D}|^2}}$$

$$\alpha_{j,i_1 \ldots i_{j-1}} = \arctan\sqrt{\frac{\sum_{i_{j+1} \ldots i_D} |a_{i_1 \ldots i_{j-1} 1 i_{j+1} \ldots i_D}|^2}{\sum_{i_{j+1} \ldots i_D} |a_{i_1 \ldots i_{j-1} 0 i_{j+1} \ldots i_D}|^2}}$$

Thus, as shown in FIG. 6A and understood from the above equations, a number of qubit atomic entities 500 are manipulated via CROT gates 504 controlled via one or more other qubit atomic entities 500. A final qubit atomic entity 500N may be manipulated via CROT gates 504 involving rotation about the $\hat{y}$ axis of the final qubit atomic entity 500N to encode sub-portion information of the multi-dimensional tensor data object. In some embodiments, the final qubit atomic entity 500N may be manipulated sequentially after the manipulation of the other qubit atomic entities 499 via CROT gates 504. Thus, as shown in FIG. 6A, the qubit atomic entities 500 (e.g., 500A-N) are manipulated to form or generate a first physical quantum representation 610 of the NAQSS quantum representation form for the multi-dimensional tensor data object. Specifically, in the first physical quantum representation 610 of the NAQSS quantum representation form, a number of qubit atomic entities 500 (e.g., 500A-500M) may encode intensity or signal value information of the multi-dimensional tensor data object, while a final qubit atomic entity 500N may encode sub-portion or segmentation information for the multi-dimensional tensor data object. Within the number of qubit atomic entities 500 (e.g., 500A-500M) encoding the intensity or signal value information of the multi-dimensional tensor data object, a first subset of qubit atomic entities 500 may encode intensity or signal value information for a first dimension of the multi-dimensional tensor data object, a second subset of qubit atomic entities 500 may encode intensity or signal value information for a second dimension of the multi-dimensional tensor data object, and so on.

As described above, the GNEQR quantum representation form, the CQIR quantum representation form, the QRDS quantum representation form, and the IFRQI quantum representation form may involve encoding of information using quantum sequences, or sequences of qubit atomic entities 500. As such, the first quantum manipulation operations for the generation and preparation of said quantum representation forms (e.g., the transforming of an all-zero state to a first physical quantum representation of said quantum representation forms) may be similar between said quantum representation forms. As a representative example, the generation and preparation of a first physical quantum representation of the GNEQR quantum representation form is herein described.

For the GNEQR quantum representation form, the intermediate state may be generated in a similar manner to the intermediate state for the FRQI quantum representation form. That is, the intermediate state for the GNEQR quantum representation form may involve the use of Hadamard quantum manipulation operations or Hadamard gates 502. The transformation is defined as $\mathcal{H} = I^{\otimes q} \otimes H^{\otimes D}$, and the intermediate state is defined as the following:

$$|\phi\rangle_1 = \frac{1}{\sqrt{2^D}} |0\rangle^{\otimes q} \otimes \sum_{x_1=0}^{2^{d_1}-1} \cdots \sum_{x_n=0}^{2^{d_n}-1} |x_1\rangle \cdots |x_n\rangle$$

Then, the transformation of the intermediate state to the first physical quantum representation of the GNEQR quantum representation form is based at least in part on the transformation U defined below:

$$U_{x_1^*, \ldots, x_n^*} = I^{\otimes q} \otimes \sum_{x_1, \ldots, x_n \neq x_1^*, \ldots, x_n^*} |x_1 \ldots x_n\rangle\langle x_1 \ldots x_n| +$$

$$\Omega_{x_1^*, \ldots, x_n^*} \otimes |x_1^* \ldots x_n^*\rangle\langle x_1^* \ldots x_n^*|$$

where $\Omega_{x_1 \ldots x_n}$ stands for the operation:

$$\Omega_{x_1, \ldots, x_n} = \bigotimes_{i=0}^{q-1} \Omega_{x_1, \ldots, x_n}^i \text{ where } \Omega_{x_1, \ldots, x_n}^i : \rightarrow |0 \oplus C^{(i)}\rangle.$$

In various embodiments, the transformation U may be realized using CNOT quantum manipulation operations, or CNOT gates, and may not be used in the generation and preparation of the FRQI quantum representation form. Overall then, the first physical quantum representation of the GNEQR quantum representation form may be generated as described below:

$$|\phi_{GNEQR}\rangle = \left( \prod_{x_1, \ldots, x_n} U_{x_1, \ldots, x_n} \right) |\phi\rangle_1$$

FIG. 7A illustrates a quantum circuit corresponding to generating a first physical quantum representation of the GNEQR quantum representation form for the multi-dimensional tensor data object. Each line of the plurality of illustrated lines represents a qubit atomic entity 500, and the plurality of qubit atomic entities 500 are initialized in an all-zero state 505. A number of qubit atomic entities 500 may be manipulated via Hadamard gates 502 to encode position information for the multi-dimensional tensor data object.

As discussed, the GNEQR quantum representation form (as well as other quantum representation forms described herein) may involve the use of a quantum sequence to encode information, such as intensity or signal value information, of the multi-dimensional tensor data object. In various embodiments, the quantum sequence may simply be one or more designated qubit atomic entities 500. For example, in the illustrated embodiment, the quantum sequence 701 for the GNEQR quantum representation form includes at least qubit atomic entities 500A, 500B (not explicitly labeled), and 500C.

To encode information in the quantum sequence 701, the $\Omega$ quantum manipulation operation, or the $\Omega$ gate 702 may be applied to the qubit atomic entities 500 of the quantum sequence 701. The $\Omega$ gate 702 may be a controlled gate using other qubit atomic entities 500. Specifically, the $\Omega$ gate 702 may be controlled using qubit atomic entities 500 of the number of qubit atomic entities 500 encoding the position information for the multi-dimensional tensor data object (and manipulated via Hadamard gates 502).

FIG. 7B specifically illustrates the $\Omega$ quantum manipulation operation or the $\Omega$ gate 702. In various embodiments, the $\Omega$ gate 702 may be implemented using controlled NOT (CNOT) quantum manipulation operations or CNOT gates 704. Again, the $\Omega$ gate 702 may manipulate qubit atomic entities 500 of the quantum sequence 701 using other qubit atomic entities 500 encoding position information for the multi-dimensional tensor data object.

As a result then, Hadamard gates 502 and the $\Omega$ gates 702 may be used to generate a first physical quantum representation 710 of the GNEQR quantum representation form for the multi-dimensional tensor data object. As previously mentioned, the GNEQR quantum representation form is described herein as a representative example of other quantum representation forms involving a quantum sequence 701, and thus, the description and visualization pertaining to the GNEQR quantum representation form may be adapted to generate first physical representations of the CQIR, QRDS, and/or IFRQI quantum representation forms (such adaptations being within the scope of the present disclosure).

Thus, various first quantum manipulation operations may be executed or performed in a quantum computing system 110 to generate a first physical quantum representation of the indicated quantum representation form for the multi-dimensional tensor data object. In various embodiments, the first physical quantum representation may be simulated in a simulated quantum computing system based at least in part on applying known actions (e.g., matrices) of various gates or quantum manipulation operations to simulated states of qubit atomic entities. Examples of first quantum manipulation operations for different quantum representation forms are visualized in FIGS. 5A, 6A, and 7A-B. In various embodiments, generation of a first physical quantum representation may be followed by additional quantum manipulation operations for processing of the information encoded or represented by the plurality of qubit atomic entities 500. For example, the multi-dimensional tensor data object may be a two-dimensional image, and the first physical quantum representation representing the two-dimensional image may be manipulated (each qubit atomic entity 500 may be manipulated via quantum manipulation operations) to crop, pad, rotate, translate, transform, filter, normalize, and/or the like the two-dimensional image. It may be appreciated that such processing operations may be part of a high-level application or processing pipeline.

TQFT Quantum Manipulation Operations

Process 400 may further comprise step 404, which comprises determining one or more second quantum manipulation operations for a second physical quantum representation representing a Fourier transform of the multi-dimensional tensor data object. Specifically, the second quantum manipulation operations transform the first physical quantum representation representing the multi-dimensional tensor data object into a second physical quantum representation representing a (multi-dimensional and discrete) Fourier transform of the multi-dimensional tensor data object. Thus, the one or more second quantum manipulation operations may then be the TQFT. It may be appreciated that while the first physical quantum representation may be of a particular quantum representation form (e.g., FRQI, NAQSS, GNEQR, CQIR, QRDS, IFRQI) and may be transformed into the second physical quantum representation, the second physical quantum representation may also be of the same particular quantum representation form. This enables information and measurements to be obtained from the second physical quantum representation in a structured form or manner. For example, for a first physical quantum representation of the GNEQR quantum representation form with intensity or signal value information of a multi-dimensional tensor data object encoded in a quantum sequence, a corresponding second physical quantum representation may also be in the GNEQR quantum representation form and encode intensity or signal value information of a Fourier transform of the multi-dimensional tensor data object in the same quantum sequence (or the same sequence of qubit atomic entities 500).

In various embodiments, the system computing entity 10 and/or the controller 30 may be configured to determine one or more second quantum manipulation operations to transform the first physical quantum representation into a second physical quantum representation encoding or representing the Fourier transform of the multi-dimensional tensor data object. For example, the system computing entity 10 and/or the controller 30 may be configured to retrieve from memories 210, 322, 324 or reference within memories 210, 322, 324 various quantum manipulation operations and/or sequences of quantum manipulation operations relevant for transforming a physical quantum representation according to the TQFT. In various embodiments, the system computing entity 10 and/or the controller 30 may store and/or manage a quantum manipulation operation queue to which second quantum manipulation operations may be added. The system computing entity 10 and/or the controller 30 may be further configured to determine additional parameters for each determined second quantum manipulation operations, such as a location of a subject qubit atomic entity (e.g., within a specific portion of the atomic entity trap apparatus and/or package 50), one or more manipulation sources 60 to use for the second quantum manipulation operations, relative and/or absolute timing of each second quantum manipulation operation, and/or the like. In some embodiments, determining the one or more second quantum manipulation operations may comprise simulating the one or more second quantum manipulation operations within a controlled simulated (e.g., computer-aided) environment.

In various embodiments, the second quantum manipulation operations may be determined based at least in part on concepts of a technique for transforming discrete Fourier transform (DFT) into matrix multiplication form. For a multi-dimensional tensor $t \in \mathbb{C}^{2^{d_1} \times 2^{d_2} \times \cdots \times 2^{d_n}}$, where n is the order of the multi-dimensional tensor t and $d_i$ describes the length of the dimension i, the DFT on a tensor element level, or the element-wise DFT, may be defined as the following:

$$T(\xi_1, \xi_2, \ldots, \xi_n) = \sum_{x_1=0}^{d_1-1} \cdots \sum_{x_n=0}^{d_n-1} \omega_{d_1}^{x_1 \xi_1} \cdots \omega_{d_n}^{x_n \xi_n} t(x_1, x_2, \ldots, x_n) \text{ where } \omega_{d_i} =$$

$$e^{-j2\pi/d_i} \text{ for } i = 1, 2, \ldots, n.$$

In the above equation, $T(\xi_1, \xi_2, \ldots, \xi_n)$ represents the DFT of the multi-dimensional tensor t. The above equation defining the DFT of the multi-dimensional tensor t may be equivalent to the following:

$$\text{vec}_T = W \text{vec}_t$$

where $W = W_{d_1} \otimes W_{d_2} \otimes \cdots \otimes W_{d_n}$ and $W_{d_i}(p,q) = \omega_{d_i}^{pq}$ for $p,q = 0,1, \ldots, d_i-1$.

In the present disclosure herein, $\otimes$ describes the Kronecker product of matrices, $\text{vec}_t$ describes the vectorial form of the input multi-dimensional tensor t, and $\text{vec}_T$ describes the Fourier transform of the multi-dimensional tensor t, or the frequency domain tensor T. These vectorial forms of the multi-dimensional tensor and its Fourier transform may be defined as follows:

$$\text{vec}_t(x) = t(x_1, x_2, \ldots, x_n)$$

where $x = \sum_{i=1}^{n} x_i \Pi_{j=i+1}^{n} d_j = (x_1, x_2, \ldots, x_n)_s$ and $$\text{vec}_T(\xi) = T(\xi_1, \xi_2, \ldots, \xi_n)$$

where $\xi = \sum_{i=1}^{n} \xi_i \Pi_{j=i+1}^{n} d_j = (\xi_1, \xi_2, \ldots, \xi_n)_s$.

In the above equations, S is a n-digit numeral system with radix $d_i$ on the $i^{th}$ significant bit. Meanwhile, the Kronecker product C of two matrices A and B may be defined as C(i, j) = C(rp+v, sq+w) = A(r, s)B(v, w) for $C = A \otimes B$ where $A \in \mathbb{C}^{m \times n}$ and $B \in \mathbb{C}^{p \times q}$. Clearly, i may be viewed under the radix of p (e.g., $i = (rv)_p$) and j may be viewed under the radix of q (e.g., $j = (sw)_q$).

To show that the above vectorization and use of Kronecker products may be applied to accurately obtain the Fourier transform of the input multi-dimensional tensor t, the Kronecker product of two matrices may first be generalized to n number of matrices $W_{d_1}, W_{d_2}, \ldots, W_{d_n}$ as defined previously. Then, elements of a matrix W as defined previously (a Kronecker product of the n number of matrices $W_{d_i}$) may be determined using the definition of two matrices $A = W_{d_1} \otimes W_{d_2} \otimes \cdots \otimes W_{d_{n-1}}$ and $B = W_{d_n}$. A matrix $W_i$ may then be defined recursively as the following:

$$W_i = W_{d_1} \otimes W_{d_2} \otimes \cdots \otimes W_{d_i} \text{ for } i = 1, 2, \ldots, n.$$

From this recursive definition, it is apparent that $W_1 = W_{d_1}$ and $W_n = W$. Using the series $\{a_i\}$ and $\{b_i\}$ for row and column indexing of a matrix $W_i$, an element $(a^*_n, b^*_n)$ in W, which is consistent with an element $(\xi^*_n, x^*_i)$ in matrix $W_{d_i}$ may be defined by the following recursive approach:

$$W(a_n^*, b_n^*) = W_{n-1}(a_{n-1}^*, b_{n-1}^*)W_{d_n}(\xi_n^*, x_n^*)$$

$$= \ldots$$

$$= W_{d_1}(\xi_1^*, x_1^*)W_{d_2}(\xi_2^*, x_2^*) \ldots W_{d_n}(\xi_n^*, x_n^*)$$

$$= \omega_{d_1}^{x_1^*\xi_1^*}\omega_{d_2}^{x_2^*\xi_2^*} \ldots \omega_{d_n}^{x_n^*\xi_n^*}$$

In the above equations, the indexing series $\{a^*_1, a^*_2, \ldots, a^*_n\}$ and $\{b^*_1, b^*_2, \ldots, b^*_n\}$ follow the properties defined below:

$$a^*_i = a^*_{i-1}d_i + \xi^*_i$$

$$b^*_i = b^*_{i-1}d_i + x^*_i$$

where $i=2,3,\ldots,n; a^*_1 = \xi^*_1; b^*_1 = x^*_1$

Thus, using the n-digit numeral system S, each index may be expanded into a form defined below:

$$a_n^* = a_{n-1}^* d_n + \xi_n^*$$
$$= (a_{n-2}^* d_{n-1} + \xi_{n-1}^*)d_n + \xi_n^*$$
$$= a_{n-2}^* d_{n-1} d_n + \xi_{n-1}^* d_n + \xi_n^*$$
$$= \ldots$$
$$= \xi_1^* d_2 \ldots d_n + \xi_2^* d_3 \ldots d_n + \ldots + \xi_{n-1}^* d_n \ldots \xi_n^*$$
$$= (\xi_1^* \xi_2^* \ldots \xi_n^*)_S$$

Similar to the above equations, $b^*_n$ may be similarly expanded, matching S. Thus, in conclusion, the following equations provide the Fourier coefficient for a point $(x^*_1, x^*_2, \ldots, x^*_n)$ in the time domain and frequency $(\xi^*_1, \xi^*_2, \ldots, \xi^*_n)$:

$$W(a^*_n, b^*_n) \omega_{d_1}^{x^*_1\xi^*_n} \omega_{d_n}^{x^*_n\xi^*_n}$$

Then, focusing on a single row of the matrix W may be done by fixing an index, such as $a_n = \bar{a}_n = (\xi_1 \xi_2 \ldots \xi_n)_s$. By following the n-digit numeral system S again, the vectorization of t is described as follows:

$$F(\overline{\xi_1}, \overline{\xi_2}, \ldots \overline{\xi_n}) = W(\bar{a}_n, :)vec_t =$$

$$\sum_{b=0}^{d_1 d_2 \ldots d_n - 1} W(\bar{a}_n, b)vec_t(b) = \sum_{x_1=0}^{d_1-1} \ldots \sum_{x_n=0}^{d_n-1} \omega_{d_1}^{x_1\overline{\xi_1}} \ldots \omega_{d_n}^{x_n\overline{\xi_n}} t(x_1, x_2, \ldots, x_n)$$

As will be understood, the above equations are consistent with the equation defining the element-wise DFT, thereby showing and proving that vectorization and the Kronecker product may be applied to arrive at the Fourier transform of a multi-dimensional tensor data object. The n-dimensional IDFT may be given upon modification of the Fourier coefficient $e^{-j2\pi \times \xi/d}$ to $e^{j2\pi \times \xi/d}/d$. Because the Kronecker product describes the entanglement of the states of two qubit atomic entities 500, quantum manipulation operations may be used to obtain the Fourier transform of a multi-dimensional tensor data object using qubit atomic entities. In various embodiments then, the system computing entity 10 and/or the controller 30 may be configured to, based at least in part on the equations and concepts described above, determine one or more second quantum manipulation operations to generate a second physical quantum representation (e.g., transformed from a first physical quantum representation) representing the Fourier transform of a multi-dimensional tensor data object.

Process 400 may then comprise step 405 (in one embodiment, step 405 may follow step 404). Step 405 comprises generating the second physical quantum representation by manipulating the plurality of qubit atomic entities based at least in part on the one or more second quantum manipulation operations. In various embodiments, the one or more second quantum manipulation operations may be executed or performed based at least in part on various parameters determined by the system computing entity 10 and/or the controller 30. For example, each of the one or more second quantum manipulation operations may be executed by one or more determined manipulation sources 60 (e.g., via a laser beam 66) on one or more particular qubit atomic entities at a specific timepoint within an operational time course. In some embodiments, the system computing entity 10 and/or the controller 30 store, manage, and/or use a quantum manipulation operation queue such that the one or more second quantum manipulation operations are executed or performed in the quantum computing system 110 in a specific sequence and/or at specific timepoints within an operational time course.

The one or more second quantum manipulation operations may be determined, executed, and/or performed based at least in part on the indicated quantum representation form, as different qubit atomic entities may be in different states and encode different portions of information depending on the indicated quantum representation form. Referring first to FIG. 5B, a quantum circuit corresponding to second quantum manipulation operations for transforming a first physical quantum representation 510 of the FRQI quantum representation form is provided. The first physical quantum representation 510 of the FRQI quantum representation form may be first generated via the first quantum manipulation operations previously described and illustrated in FIG. 5A.

Because the FRQI quantum representation form stores intensity or signal value information as cosine and sine components, manipulation of both components may be necessary for TQFT. The probability amplitude vector of the first physical quantum representation 510 of the FRQI quantum representation form, or $|\phi_{FRQI}\rangle$, satisfies the numeral system S, where S is a n-digit numeral system with radix $2^{d_i}$. For a cosine component then, the TQFT may be conceptually described as the following:

$$\phi_{cos} = F_{d_1, \ldots, d_n}{}^n \Theta_{cos} \text{ where } F_{d_1, \ldots, d_n}{}^n = F_{d_1}{}^1 \otimes \ldots \otimes F_{d_n}{}^1$$

In the above equation, $\Theta_{cos}$ describes the probability amplitude vector of the cosine component, and $\Phi_{cos}$ is the corresponding resulting cosine component after TQFT. Additionally, $F_{d_i}{}^1$ describes a 1-dimensional TQFT for $d_i$ qubits. The TQFT for a sine component is similarly described and thus, the overall TQFT in the FRQI quantum representation form may be described as the following:

$$\Phi = F_{d_1, \ldots, d_n}{}^n \Theta$$

$$\text{where } F_{d_1, \ldots, d_n}{}^n = I_2 \otimes F_{d_1}{}^1 \otimes \ldots \otimes F_{d_n}{}^1$$

$\Theta$ in the above equation describes the probability amplitude vector for the first physical quantum representation 510 of the FRQI quantum representation form, and $I_2$ describes a 2×2 identity matrix. The TQFT in the FRQI quantum representation form may then be described as also the following:

$$\text{TQFT}|\phi_{FRQI}\rangle = |c\rangle \otimes \text{QFT}|x_1\rangle \otimes \ldots \otimes \text{QFT}|x_n\rangle$$

This above equation is consistent with the quantum circuit depicted in FIG. 5B, which illustrates a second physical quantum representation 520 of the FRQI quantum representation form being generated from transforming the first physical quantum representation 510 of the FRQI quantum representation form. As can be seen in FIG. 5B and from the above equation, the second physical quantum representation representing the Fourier transform of the multi-dimensional data object may be generated by performing one-dimensional quantum Fourier transforms for each number of qubit atomic entities 500 encoding information for one dimension of multi-dimensional tensor data object. Accordingly, each one-dimensional quantum Fourier transform for each dimension of the multi-dimensional data tensor data object may be performed in parallel, as different qubit atomic entities 500 are used to encode information for different dimensions.

Specifically, the one-dimensional quantum Fourier transform for the number of qubit atomic entities 500 encoding information for one dimension involves applying a Hadamard gate 502 to a first qubit atomic entity 500, followed by multiple phase gates 506 controlled by the other qubit atomic entities 500. As previously discussed, the Hadamard gate 502 may be defined as $$H = \frac{1}{\sqrt{2}}\begin{bmatrix} 1 & 1 \\ 1 & -1 \end{bmatrix}.$$

A phase gate 506 may be defined as $$R_m = \begin{bmatrix} 1 & 0 \\ 0 & e^{2\pi i/2^m} \end{bmatrix},$$

and a corresponding CROT gate may then be defined as $$CROT_m = \begin{bmatrix} I & 0 \\ 0 & R_m \end{bmatrix}.$$

Thus, quantum manipulation operations for the TQFT in the FRQI quantum representation form may be executed or performed in a parallel manner leading to advantageous conservation of processing time and resources.

Similar as the TQFT in the FRQI quantum representation form, TQFT in the NAQSS quantum representation form may involve manipulation of both the cosine and sine components. The TQFT in the NAQSS quantum representation form may be described as the following:

$$TQFT|\phi\rangle_{NAQSS}\mathbb{C} = QFT|x_1\rangle\mathbb{C} \otimes \ldots \otimes QFT|x_n\rangle\mathbb{C} \otimes |X\rangle\mathbb{C}$$

The above equation is visualized by FIG. 6B, in which a second physical quantum representation 620 of the NAQSS quantum representation form is generated by transforming the first physical quantum representation 610 of the NAQSS quantum representation form (via the second quantum manipulation operations). The first physical quantum representation 610 of the NAQSS quantum representation form may be first generated via the first quantum manipulation operations previously described and illustrated in FIG. 6A. As shown, the one-dimensional quantum Fourier transform may be executed or performed for each number of qubit atomic entities 500 encoding information for a dimension of the multi-dimensional tensor data object. Specifically, the one-dimensional quantum Fourier transform is executed or performed in parallel for multiple numbers of qubit atomic entities 500 for the multiple dimensions of the multi-dimensional tensor data object. As discussed, the one-dimensional quantum Fourier transform involves applying the Hadamard gate 502 to a qubit atomic entity 500 followed by applying multiple sequential phase gates 506, each phase gate 506 controlled by another qubit atomic entity 500.

Referring now to FIG. 7C, the second quantum manipulation operations for the TQFT in the GNEQR and CQIR physical quantum representation forms is visualized. Specifically, a second physical quantum representation 720 is generated from a first physical quantum representation 710, where the first and second physical quantum representations may be of the GNEQR quantum representation form or the CQIR quantum representation form. Both the GNEQR and CQIR quantum representation forms may involve encoding of information in the quantum sequence 701 and require a total D+q number of qubits. The TQFT of the GNEQR and the CQIR quantum representation form may be described as the following:

$$\Phi = F_{d_1,\ldots,d_n}{}^n \Theta$$

where $F_{d_1,\ldots,d_n n} = I_{2^q} \otimes F_{d_1}{}^1 \otimes \ldots \otimes F_{d_n}{}^1$ Again, as shown in FIG. 7C, one-dimensional quantum Fourier transforms may be performed in parallel for each number of qubit atomic entities 500 encoding information for one dimension of the multi-dimensional tensor data object, and the one-dimensional quantum Fourier transform involves applying the Hadamard gate 502 and multiple sequential phase gates 506 controlled by each of the other qubit atomic entities 500 to one qubit atomic entity 500.

Meanwhile, the second quantum manipulation operations for the TQFT in the QRDS quantum representation form and the IFRQI quantum representation form are illustrated by FIGS. 8 and 9, respectively. Both of the QRDS quantum representation form and the IFRQI quantum representation form involve the encoding of information using the quantum sequence 701, and each differ from each other, the GNEQR quantum representation form, and the CQIR quantum representation form by the manner in which information is encoded in the quantum sequence 701.

For example, FIG. 8 illustrates the second physical quantum representation 820 of the QRDS quantum representation form being generated from transforming a first physical quantum representation 810, and specifically, by performing the one-dimensional quantum Fourier transform in parallel on qubit atomic entities 500 encoding information for different dimensions of the multi-dimensional tensor data object.

Similarly, FIG. 9 illustrates the second physical quantum representation 920 of the IFRQI quantum representation form being generated from transforming a first physical quantum representation 910. The one-dimensional quantum Fourier transform may be performed in parallel on qubit atomic entities 500 encoding information for a first dimension of the multi-dimensional tensor data object, qubit atomic entities 500 encoding information for a second dimension of the multi-dimensional tensor data object, and so on.

Thus, as a result of the second quantum manipulation operations (which may be applied uniquely based at least in part on the indicated quantum representation form), a second physical quantum representation representing the Fourier transform of the multi-dimensional tensor data object may be generated. Due to some of the second quantum manipulation operations being performed in parallel for each dimension of the multi-dimensional tensor data object, the Fourier transform of multi-dimensional tensor data objects of large orders may advantageously be obtained in a fast and efficient manner. Specifically, the Fourier transform of multi-dimensional tensor data objects may be obtained via TQFT in a quantum computing system 110 at a time complexity of $\mathcal{O}(\Sigma_{i=1}^{n} d_i^2)$, which in some instances, may be even more efficient than classical methods (e.g., FFT) in classical computing systems.

In various embodiments, the second quantum manipulation operations may be applied in a simulated quantum computing system. For example, a simulated quantum computing system may comprise simulated states for qubit atomic entities or simulated qubit atomic entities, and may model new simulated states for the qubit atomic entities based at least in part on the characteristics, actions, and/or outputs of the second quantum manipulation operations. Thus, in various embodiments, the system computing entity 10 may provide the second quantum manipulation operations to a simulated quantum computing system to cause the second quantum manipulations operations to be performed in the simulated quantum computing system to simulate the second physical quantum representation representing the Fourier transform of the multi-dimensional tensor data object.

Quantum State Measurement and TQFT Output

In various embodiments, the second manipulation operations for the TQFT may be followed by additional quantum manipulation operations for further processing of the multi-dimensional tensor data object. That is, the second physical quantum representation representing the Fourier transform of the multi-dimensional tensor data object may be further manipulated or transformed to represent the action or output of further processing on the Fourier transform of the multi-dimensional tensor data object. In various embodiments then, the second physical quantum representation may be manipulated or transformed via additional quantum manipulation operations to crop, pad, rotate, translate, transform, filter, normalize, and/or the like the Fourier transform of the multi-dimensional tensor data object. For example, additional quantum manipulation operations may be performed to weight or intensify low frequency information of the Fourier transform of the multi-dimensional tensor data object, and further quantum manipulation operations for the inverse Fourier transform of the multi-dimensional tensor data object may be performed to obtain a lowpass-filtered version of the original multi-dimensional tensor data object. Thus, in general, the second quantum manipulation operations for the TQFT may be a part of a larger or high-level application or processing pipeline and, therefore, may be preceded and/or followed by other quantum manipulation operations representing other processing of the multi-dimensional tensor data object.

Returning now to FIG. 4, process 400 may further comprise step 406, which comprises generating an output data object representing the Fourier transform of the multi-dimensional tensor data object based at least in part on measuring each of the plurality of qubit atomic entities. The plurality of qubit atomic entities may be configured in the second physical quantum representation representing the Fourier transform of the multi-dimensional tensor data object, and as such, the output data object may be generated based at least in part on the second physical quantum representation to describe the Fourier transform of the multi-dimensional tensor data object. In various embodiments, the system computing entity 10 generates the output data object based at least in part on data received from the quantum computing system 110 (e.g., the controller 30). In various embodiments, the controller 30 generates the output data object and provides the output data object to the system computing entity 10.

In various embodiments, the output data object comprises a frequency-domain multi-dimensional tensor corresponding to the multi-dimensional tensor data object. That is, the frequency-domain multi-dimensional tensor is the Fourier transform of the multi-dimensional tensor data object. The frequency-domain multi-dimensional tensor may be represented by and/or generated from the second physical quantum representation, in which various qubit atomic entities encode information for the frequency-domain multi-dimensional tensor according to the indicated quantum representation form. As such, the frequency-domain multi-dimensional tensor may be generated based at least in part on extracting information from the qubit atomic entities of the second physical quantum representation, such as measuring probability amplitudes of each qubit atomic entity or measuring the quantum state of each qubit atomic entity.

In various embodiments, extraction of information from the qubit atomic entities of the second physical quantum representation is performed based at least in part on the indicated quantum representation form. As previously described, the FRQI and NAQSS quantum representation form encode intensity information in the probability amplitudes of the qubit atomic entities, the GNEQR, CQIR, and QSR quantum representation forms encode intensity information in the quantum states of the qubit atomic entities, and the IFRQI quantum representation form encodes intensity information in both the probability amplitudes and quantum states of the qubit atomic entities. Furthermore, different qubit atomic entities are used for different information encoding purposes in each quantum representation form. For example, the GNEQR quantum representation form uses a particular number of qubit atomic entities as a quantum sequence to encode information. Thus, specific information (e.g., probability amplitude, quantum state) may be extracted from particular qubit atomic entities depending on the quantum representation form.

In various embodiments, the quantum computing system 110 is configured to extract information from and/or measure the qubit atomic entities in the atomic entity trap apparatus and/or package 50. For example, the probability amplitude and/or the quantum state of a qubit atomic entity trapped in the atomic entity trap apparatus and/or package 50 may be measured using the manipulation sources 60 (e.g., via laser beams 66), various optical systems, various electrodes controlled by voltage sources 55, and/or the like. Such measurements may be analog measurements, and the controller 30 may use the analog-digital converter elements 225 to generate data for the output data object and/or the output data object itself.

As should be understood, measurement of qubit atomic entities may be irreversible. As such, in certain embodiments, the qubit atomic entities of the second physical quantum representation may be measured (e.g., observed) once to generate the output data object. Due to the superposition of qubit atomic entities, a probability that the measured information from the qubit atomic entity is consistent with the quantum manipulation operations and the desired state of the qubit atomic entity may exist. Accordingly, generating the output data object may comprise generating a confidence score based at least in part on such a probability.

In various embodiments, the output data object is generated based at least in part on measuring the plurality of qubit atomic entities after further quantum manipulation operations performed on the qubit atomic entities. Again, measurement of the qubit atomic entities may be irreversible, so preemptive measurement to generate the output data object may preclude further computational processing in the quantum computing field on the Fourier transform of the multi-dimensional tensor data object represented by the second physical quantum representation. Accordingly, further quantum manipulation operations representing further processing may be executed or performed, and subsequently, the output data object may be generated based at least in part on measuring the plurality of qubit atomic entities.

In various embodiments, the output data object is generated based at least in part on data generated by and/or received from a simulated quantum computing system. For example, the simulated quantum computing system may simulate the second physical quantum representation representing the Fourier transform of the multi-dimensional tensor data object and may provide (e.g., output) various data describing the superposition states, probabilities, probability amplitudes, and/or the like for the qubit atomic entities (e.g., simulated qubit atomic entities) of the second physical quantum representation. Due to the simulated nature of the second physical quantum representation in a simulated quantum computing system, measurements may be obtained repeatedly, in some instances, and further processing of the second physical quantum representation via quantum manipulation operations may continue to be performed.

Process 400 may further comprise step 407. Step 407 comprises performing one or more automated actions based at least in part on the output data object. In various embodiments, the output data object comprising a frequency-domain multi-dimensional tensor that is the Fourier transform of the multi-dimensional tensor data object may be provided to a classical computing system and/or a quantum computing system 110 for further processing. As understood by those in the field to which the present disclosure pertains, a vast number of processing operations are relevant to and may be performed in the frequency domain. Thus, the one or more automated actions may comprise automatically providing the output data object to a classical computing system and/or a quantum computing system 110 for further processing, such as in a high-level application or processing pipeline. Such further processing may be indicated, selected, and/or the like by a user via user input. For example, the system computing entity 10 receives user input comprising instructions for further processing of the output data object.

Similarly, the output data object may be further processed to visualize the frequency-domain multi-dimensional tensor for an end user, in various embodiments. That is, in various embodiments, the one or more automated actions comprises displaying the frequency-domain multi-dimensional tensor (e.g., within a frequency-domain manifold or graph) on a user interface. For example, the system computing entity 10 may display the frequency-domain multi-dimensional tensor and/or the output data object for the end user via display 316.

The one or more automated actions may comprise comparing the output data object to a data object generated via a classical computing system. In doing so, the accuracy of the frequency-domain multi-dimensional tensor of the output data object and/or the accuracy of the TQFT performed in the quantum computing system 110 may be determined and quantified. Such information may be used to further configure components or parameters of the quantum computing system 110, such as to eliminate computational errors that may have occurred in the performed TQFT.

VII. Conclusion

It should be understood that the examples and embodiments described herein are for illustrative purposes only and that various modifications or changes in light thereof will be suggested to persons skilled in the art and are to be included within the spirit and purview of this application.

Many modifications and other embodiments of the present disclosure set forth herein will come to mind to one skilled in the art to which the present disclosures pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claim concepts. Although specific terms are employed herein, they are used in a generic and descriptive sense only and not for purposes of limitation.

The invention claimed is:

1. A computer-implemented method comprising:
   receiving a multi-dimensional Fourier transform operation request comprising a multi-dimensional tensor data object and a quantum representation form, wherein the quantum representation form comprises a representation that corresponds to an encoding of a set of qubit atomic entity states;
   determining one or more first quantum manipulation operations to be performed on a plurality of qubit atomic entities based on the quantum representation form;
   generating, based on the one or more first quantum manipulation operations, a first physical quantum representation representing the multi-dimensional tensor data object in accordance with the quantum representation form;
   determining one or more second quantum manipulation operations to transform the first physical quantum representation into a Fourier transform of the multi-dimensional tensor data object;
   generating, based on the one or more second quantum manipulation operations, a second physical quantum representation representing the Fourier transform of the multi-dimensional tensor data object in accordance with the quantum representation form;
   generating an output data object based on a configuration of the plurality of qubit atomic entities in accordance with the second physical quantum representation; and
   providing the output data object to a computing system.

2. The computer-implemented method of claim 1, wherein the output data object represents the Fourier transform of the multi-dimensional tensor data object and the computer-implemented method further comprises generating the output data object by measuring each of the plurality of qubit atomic entities configured in accordance with the second physical quantum representation.

3. The computer-implemented method of claim 1, further comprising:
   receiving a second operation request corresponding to an operation to process one of (i) the multi-dimensional tensor data object represented by the first physical quantum representation, or (ii) the Fourier transform of the multi-dimensional tensor data object represented by the second physical quantum representation;

determining one or more additional quantum manipulation operations for processing one of (i) the multi-dimensional tensor data object represented by the first physical quantum representation, or (ii) the Fourier transform of the multi-dimensional tensor data object represented by the second physical quantum representation; and generating a third physical quantum representation by manipulating the plurality of qubit atomic entities based on the one or more additional quantum manipulation operations.

4. The computer-implemented method of claim 3 further comprising generating the output data object by measuring each of the plurality of qubit atomic entities configured in accordance with the third physical quantum representation.

5. The computer-implemented method of claim 1, wherein the quantum representation form comprises one or more of (i) Flexible Representation of Quantum Images (FRQI), (ii) normal arbitrary quantum superposition state (NAQSS), (iii) generalized Novel Enhanced Quantum Representation (GNEQR), (iv) Caraiman's Quantum Image Representation (CQIR), (v) quantum representation of real-valued digital signals (QRDS), or (vi) Improved FRQI (IFRQI).

6. The computer-implemented method of claim 1, wherein generating the second physical quantum representation comprises manipulating one or more subsets of qubit atomic entities of the plurality of qubit atomic entities at a substantially same time in parallel, wherein a subset of qubit atomic entities of the one or more subsets of qubit atomic entities encodes the multi-dimensional tensor data object in one dimension.

7. The computer-implemented method of claim 6, wherein each subset of qubit atomic entities of the one or more subsets of qubit atomic entities is manipulated according to a one-dimensional quantum Fourier transform (1-D QFT).

8. The computer-implemented method of claim 1 further comprising generating a visualization of the output data object and providing the visualization for display.

9. The computer-implemented method of claim 1, wherein the plurality of qubit atomic entities comprises a plurality of simulated qubits within a simulated quantum system.

10. An apparatus comprising at least one processor and at least one memory including program code, the at least one memory and the program code configured to, with the at least one processor, cause the apparatus to at least:
receive a multi-dimensional Fourier transform operation request comprising a multi-dimensional tensor data object and a quantum representation form, wherein the quantum representation form comprises a representation that corresponds to an encoding of a set of qubit atomic entity states;
determine one or more first quantum manipulation operations to be performed on a plurality of qubit atomic entities based on the quantum representation form;
generate, based on the one or more first quantum manipulation operations, a first physical quantum representation representing the multi-dimensional tensor data object in accordance with the quantum representation form;
determine one or more second quantum manipulation operations to transform the first physical quantum representation into a Fourier transform of the multi-dimensional tensor data object;
generate, based on the one or more second quantum manipulation operations, a second physical quantum representation representing the Fourier transform of the multi-dimensional tensor data object in accordance with the quantum representation form;
generate an output data object based on a configuration of the plurality of qubit atomic entities in accordance with the second physical quantum representation; and
providing the output data object to a computing system.

11. The apparatus of claim 10, wherein the output data object represents the Fourier transform of the multi-dimensional tensor data object and wherein the at least one memory and the program code are further configured to, with the at least one processor, cause the apparatus to at least:
generate the output data object by measuring each of the plurality of qubit atomic entities configured in accordance with the second physical quantum representation.

12. The apparatus of claim 10, wherein the at least one memory and the program code are further configured to, with the at least one processor, cause the apparatus to at least:
receive a second operation request corresponding to an operation to process one of (i) the multi-dimensional tensor data object represented by the first physical quantum representation, or (ii) the Fourier transform of the multi-dimensional tensor data object represented by the second physical quantum representation;
determine one or more additional quantum manipulation operations for processing one of (i) the multi-dimensional tensor data object represented by the first physical quantum representation, or (ii) the Fourier transform of the multi-dimensional tensor data object represented by the second physical quantum representation; and
generate a third physical quantum representation by manipulating the plurality of qubit atomic entities based on the one or more additional quantum manipulation operations.

13. The apparatus of claim 12, wherein the at least one memory and the program code are further configured to, with the at least one processor, cause the apparatus to at least:
generate the output data object by measuring each of the plurality of qubit atomic entities configured in accordance with the third physical quantum representation.

14. The apparatus of claim 10, wherein the quantum representation form comprises one or more of (i) Flexible Representation of Quantum Images (FRQI), (ii) normal arbitrary quantum superposition state (NAQSS), (iii) generalized Novel Enhanced Quantum Representation (GNEQR), (iv) Caraiman's Quantum Image Representation (CQIR), (v) quantum representation of real-valued digital signals (QRDS), or (vi) Improved FRQI (IFRQI).

15. The apparatus of claim 10, wherein to generate the second physical quantum representation, the at least one memory and the program code are further configured to, with the at least one processor, cause the apparatus to at least:
manipulate one or more subsets of qubit atomic entities of the plurality of qubit atomic entities at a substantially same time in parallel, wherein a subset of qubit atomic entities of the one or more subsets of qubit atomic entities encodes the multi-dimensional tensor data object in one dimension.

16. A computer program product comprising at least one non-transitory computer-readable storage medium having computer-readable program code portions stored therein, the computer-readable program code portions configured to:
- receive a multi-dimensional Fourier transform operation request comprising a multi-dimensional tensor data object and a quantum representation form, wherein the quantum representation form comprises a representation that corresponds to an encoding of a set of qubit atomic entity states;
- determine one or more first quantum manipulation operations to be performed on a plurality of qubit atomic entities based on the quantum representation form;
- generate, based on the one or more first quantum manipulation operations, a first physical quantum representation representing the multi-dimensional tensor data object in accordance with the quantum representation form;
- determine one or more second quantum manipulation operations to transform the first physical quantum representation into a Fourier transform of the multi-dimensional tensor data object;
- generate, based on the one or more second quantum manipulation operations, a second physical quantum representation representing the Fourier transform of the multi-dimensional tensor data object in accordance with the quantum representation form;
- generate an output data object based on a configuration of the plurality of qubit atomic entities in accordance with the second physical quantum representation; and
- providing the output data object to a computing system.

17. The computer program product of claim 16, wherein the output data object represents the Fourier transform of the multi-dimensional tensor data object and wherein the computer-readable program code portions are further configured to:
- generate the output data object by measuring each of the plurality of qubit atomic entities configured in accordance with the second physical quantum representation.

18. The computer program product of claim 16, wherein the computer-readable program code portions are further configured to:
- receive a second operation request indicating an operation to process one of (i) the multi-dimensional tensor data object represented by the first physical quantum representation, or (ii) the Fourier transform of the multi-dimensional tensor data object represented by the second physical quantum representation;
- determine one or more additional quantum manipulation operations for processing one of (i) the multi-dimensional tensor data object represented by the first physical quantum representation, or (ii) the Fourier transform of the multi-dimensional tensor data object represented by the second physical quantum representation; and
- generate a third physical quantum representation by manipulating the plurality of qubit atomic entities based on the one or more additional quantum manipulation operations.

19. The computer program product of claim 18, wherein the computer-readable program code portions are further configured to:
- generate the output data object by measuring each of the plurality of qubit atomic entities configured in accordance with the third physical quantum representation.

20. The computer program product of claim 16, wherein the quantum representation form comprises one or more of (i) Flexible Representation of Quantum Images (FRQI), (ii) normal arbitrary quantum superposition state (NAQSS), (iii) generalized Novel Enhanced Quantum Representation (GNEQR), (iv) Caraiman's Quantum Image Representation (CQIR), (v) quantum representation of real-valued digital signals (QRDS), or (vi) Improved FRQI (IFRQI).

* * * * *